US012586272B2

(12) United States Patent
Chung et al.

(10) Patent No.: US 12,586,272 B2
(45) Date of Patent: Mar. 24, 2026

(54) METHODS AND SYSTEMS FOR TRANSFERRING HAIR CHARACTERISTICS FROM A REFERENCE IMAGE TO A DIGITAL IMAGE

(71) Applicant: Ulta Salon, Cosmetics & Fragrance, Inc., Bolingbrook, IL (US)

(72) Inventors: Xin Chung, Bolingbrook, IL (US); Bruce V. Schwartz, Bolingbrook, IL (US); Giorgio Patrini, Bolingbrook, IL (US); Ajinkya Indulkar, Bolingbrook, IL (US); Ghassen Chaabouni, Bolingbrook, IL (US); Alberto Gaona, Bolingbrook, IL (US); Juan Cardelino, Montevideo (UY)

(73) Assignee: Ulta Salon, Cosmetics & Fragrance, Inc., Bolingbrook, IL (US)

( * ) Notice: Subject to any disclaimer, the term of this patent is extended or adjusted under 35 U.S.C. 154(b) by 262 days.

(21) Appl. No.: 18/332,869

(22) Filed: Jun. 12, 2023

(65) Prior Publication Data

US 2024/0412432 A1 Dec. 12, 2024

(51) Int. Cl.
*G06T 11/60* (2026.01)
*G06T 5/50* (2006.01)
(Continued)

(52) U.S. Cl.
CPC ................ *G06T 11/60* (2013.01); *G06T 5/50* (2013.01); *G06T 5/77* (2024.01); *G06T 7/194* (2017.01);
(Continued)

(58) Field of Classification Search
CPC ... G06T 11/60; G06T 5/50; G06T 5/77; G06T 2207/20021; G06T 2207/20084;
(Continued)

(56) References Cited

U.S. PATENT DOCUMENTS 6,453,052 B1 9/2002 Kurokawa et al.
8,055,011 B2 11/2011 Ikeda et al.
(Continued)

OTHER PUBLICATIONS

Azmarie Wang, Hairstyle Transfer—Semantic Editing GAN Latent Code, May 24, 2020, retrieved from the internet at: https://medium. com/swlh/hairstyle-transfer-semantic-editing-gan-latent-code-b3a6ccf91e82.
(Continued)

*Primary Examiner* — Daniel F Hajnik
*Assistant Examiner* — Thomas John Foster
(74) *Attorney, Agent, or Firm* — McDonnell Boehnen Hulbert & Berghoff LLP

(57) ABSTRACT
An example computer-implemented image processing method includes receiving a digital image including a face area of a first subject and a background area, receiving a reference image of a second subject, modifying the digital image based on the reference image utilizing a generative neural network to create a modified digital image in which a feature of the second subject is transferred to the first subject, and combining the face area of the first subject and the background area from the digital image with the feature area from the modified digital image to create a composite modified digital image that includes data representing the feature of the second subject transferred to the first subject from the modified digital image and data representing the face area of the first subject and the background area from the digital image.

25 Claims, 14 Drawing Sheets

(51) Int. Cl.

| | |
|---|---|
| *G06T 5/77* | (2024.01) |
| *G06T 7/194* | (2017.01) |
| *G06T 11/00* | (2026.01) |

(52) U.S. Cl.
CPC .. *G06T 11/001* (2013.01); *G06T 2207/20021* (2013.01); *G06T 2207/20084* (2013.01); *G06T 2207/20212* (2013.01); *G06T 2207/30201* (2013.01); *G06T 2210/44* (2013.01)

(58) Field of Classification Search
CPC . G06T 2207/20212; G06T 2207/30201; G06T 2210/44; G06T 11/00
See application file for complete search history.

(56) References Cited

U.S. PATENT DOCUMENTS

| | | | |
|---|---|---|---|
| 8,884,980 | B2 | 11/2014 | Mallick et al. |
| 9,367,940 | B2 | 6/2016 | Wang et al. |
| 9,928,601 | B2 | 3/2018 | Aarabi |
| 10,217,244 | B2 | 2/2019 | Kowalczyk et al. |
| 10,762,665 | B2 | 9/2020 | Kuo |
| 10,825,219 | B2 | 11/2020 | Fu et al. |
| 10,849,408 | B2 | 12/2020 | Skwarek |
| 11,093,733 | B2 | 8/2021 | Yuan et al. |
| 2009/0232409 | A1* | 9/2009 | Marchesotti .............. G06T 5/00 |
| | | | 382/254 |
| 2019/0035163 | A1* | 1/2019 | Skwarek .............. G06V 40/165 |
| 2020/0015155 | A1 | 1/2020 | Wakabayashi |
| 2020/0027944 | A1 | 1/2020 | Xuan et al. |
| 2021/0074076 | A1* | 3/2021 | Powers .................. G06T 7/344 |
| 2021/0142539 | A1* | 5/2021 | Ayush ...................... G06N 3/08 |
| 2022/0010157 | A1 | 1/2022 | Burtovyy et al. |
| 2022/0101577 | A1* | 3/2022 | Chakrabarty ............ G06T 7/11 |
| 2022/0392025 | A1* | 12/2022 | Mironica ................. G06T 5/50 |

OTHER PUBLICATIONS

Peihao Zhu et al, "Barbershop: GAN-based Image Compositing using Segmentation Masks:", Oct. 16, 2021, retrieved from the internet at: https://arxiv.org/pdf/2106.01505.pdf.

* cited by examiner

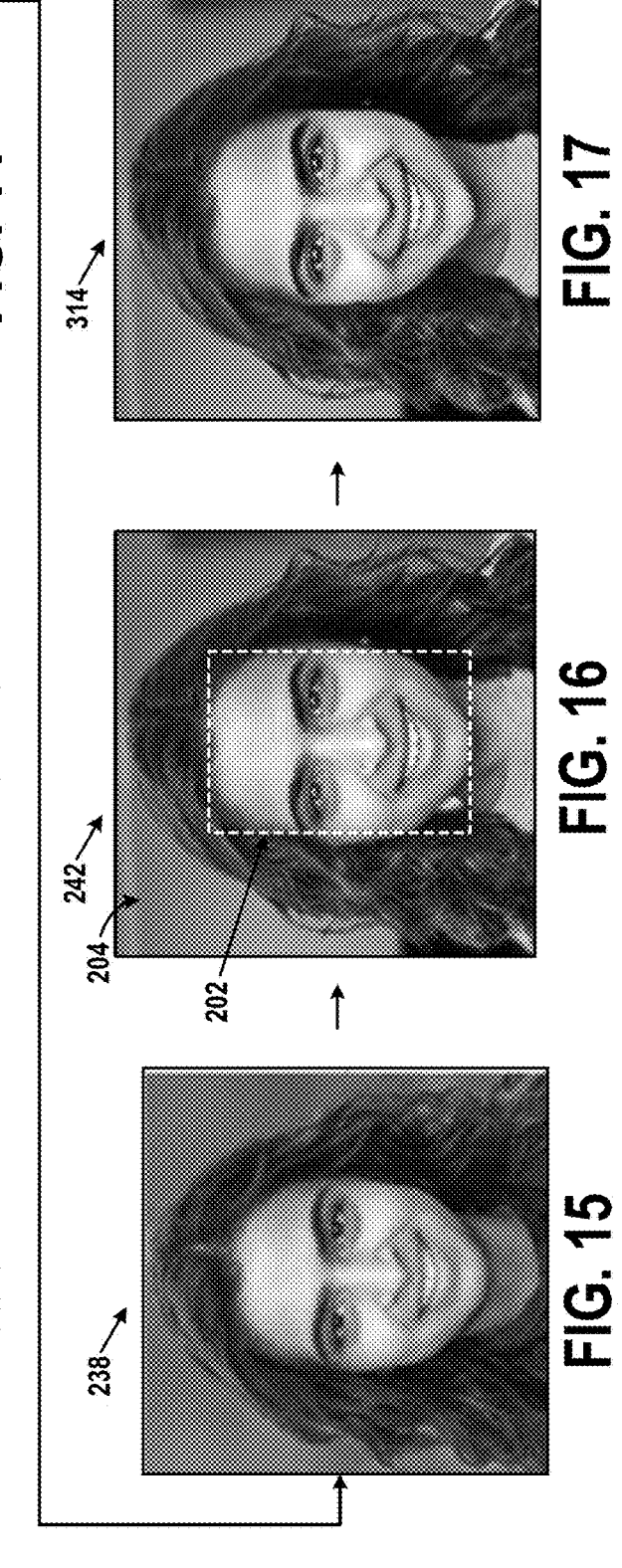
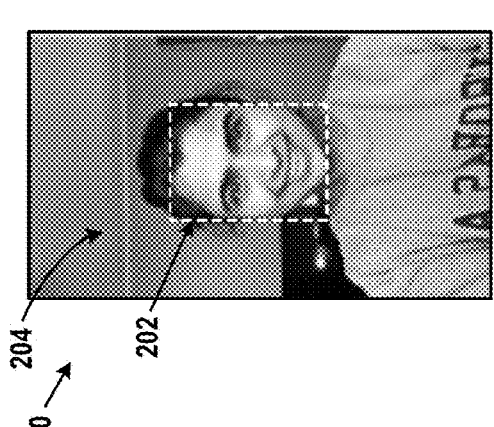
FIG. 12
FIG. 13
FIG. 14
FIG. 15
FIG. 16
FIG. 17

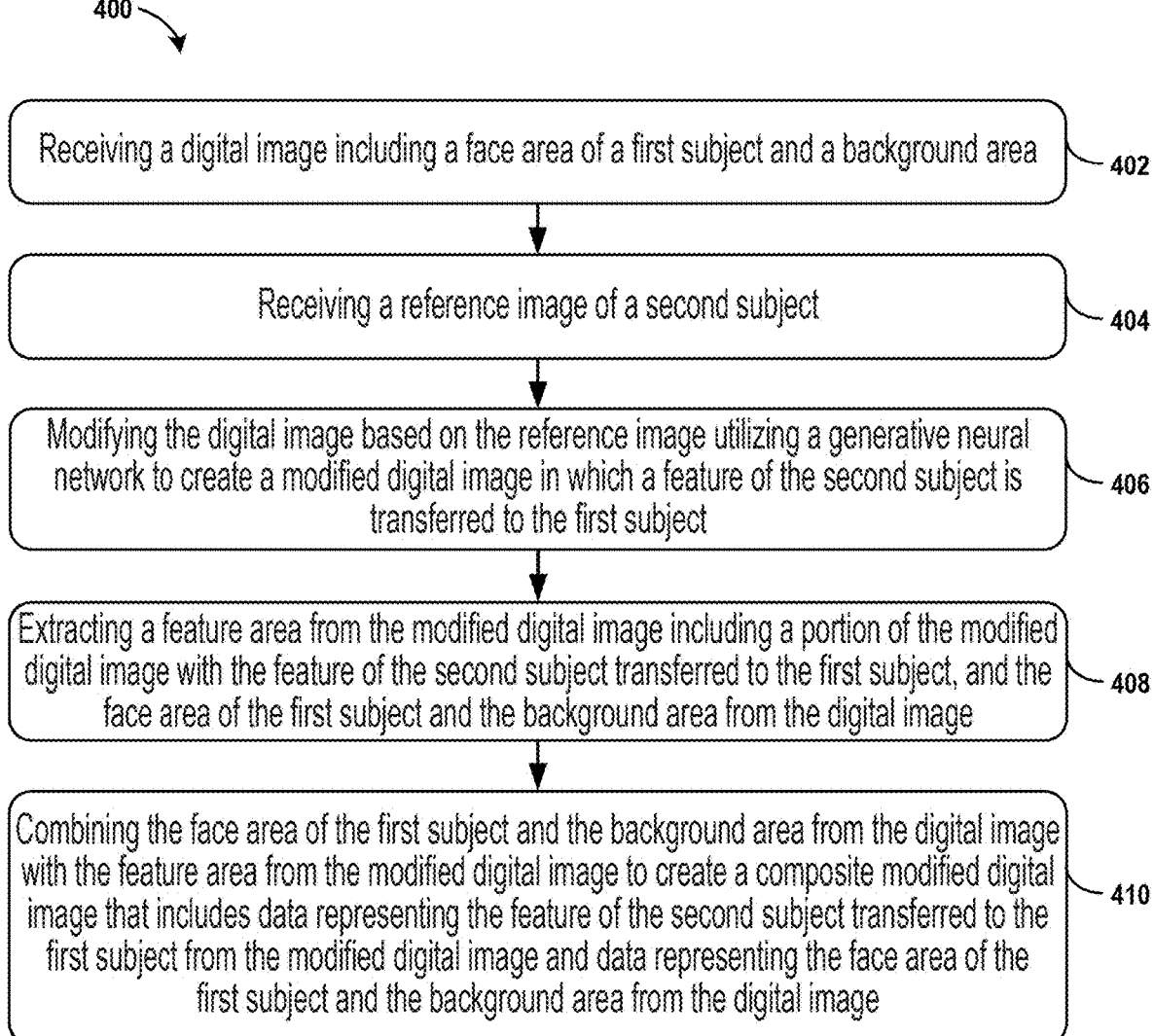

400

Receiving a digital image including a face area of a first subject and a background area    402

Receiving a reference image of a second subject    404

Modifying the digital image based on the reference image utilizing a generative neural network to create a modified digital image in which a feature of the second subject is transferred to the first subject    406

Extracting a feature area from the modified digital image including a portion of the modified digital image with the feature of the second subject transferred to the first subject, and the face area of the first subject and the background area from the digital image    408

Combining the face area of the first subject and the background area from the digital image with the feature area from the modified digital image to create a composite modified digital image that includes data representing the feature of the second subject transferred to the first subject from the modified digital image and data representing the face area of the first subject and the background area from the digital image    410

FIG. 20

METHODS AND SYSTEMS FOR TRANSFERRING HAIR CHARACTERISTICS FROM A REFERENCE IMAGE TO A DIGITAL IMAGE

FIELD

The present disclosure relates generally to methods and systems for transferring hair characteristics from a reference image to a digital image, and more particularly, to a computer-implemented image processing method for utilizing a generative neural network to create a modified digital image in which a feature of a second subject in a reference image is transferred to a first subject in a digital image and recombining a face area and a background area from an original digital image with the modified feature area from the modified digital image to create a composite modified digital image.

BACKGROUND

A hairstyle, and facial hair in general, is an important part of personal appearance and is expressive of personality and overall style. Being able to virtually "try on" different hairstyles through a computer vision system would be very beneficial, for example, to avoid costly services.

However, current methods for editing hair characteristics in an image typically do not result in photorealistic output images, or an identity of a person is not satisfactorily preserved when editing hair characteristics.

SUMMARY

Within examples, a computer-implemented tool is described that uses machine learning or generative modeling, in some aspects, to modify features in a digital image of a person (e.g., such as features of hair on a person) to enable a virtual try-on of new hair features on the person.

In one example, a computer-implemented image processing method is described, which includes receiving a digital image including a face area of a first subject and a background area, receiving a reference image of a second subject, modifying the digital image based on the reference image utilizing a generative neural network to create a modified digital image in which a feature of the second subject is transferred to the first subject, extracting a feature area from the modified digital image including a portion of the modified digital image with the feature of the second subject transferred to the first subject, and the face area of the first subject and the background area from the digital image, and combining the face area of the first subject and the background area from the digital image with the feature area from the modified digital image to create a composite modified digital image that includes data representing the feature of the second subject transferred to the first subject from the modified digital image and data representing the face area of the first subject and the background area from the digital image.

In another example, a non-transitory computer-readable media having stored therein executable instructions, which when executed by a system including one or more processors causes the system to perform functions is described. The functions comprise receiving a digital image including a face area of a first subject and a background area, receiving a reference image of a second subject, modifying the digital image based on the reference image utilizing a generative neural network to create a modified digital image in which a feature of the second subject is transferred to the first subject, extracting a feature area from the modified digital image including a portion of the modified digital image with the feature of the second subject transferred to the first subject, and the face area of the first subject and the background area from the digital image, and combining the face area of the first subject and the background area from the digital image with the feature area from the modified digital image to create a composite modified digital image that includes data representing the feature of the second subject transferred to the first subject from the modified digital image and data representing the face area of the first subject and the background area from the digital image.

In still another example, a system is described comprising one or more processors and non-transitory computer-readable media having stored therein instructions, which when executed by the one or more processors, causes the system to perform functions. The functions comprise receiving a digital image including a face area of a first subject and a background area, receiving a reference image of a second subject, modifying the digital image based on the reference image utilizing a generative neural network to create a modified digital image in which a feature of the second subject is transferred to the first subject, extracting a feature area from the modified digital image including a portion of the modified digital image with the feature of the second subject transferred to the first subject, and the face area of the first subject and the background area from the digital image, and combining the face area of the first subject and the background area from the digital image with the feature area from the modified digital image to create a composite modified digital image that includes data representing the feature of the second subject transferred to the first subject from the modified digital image and data representing the face area of the first subject and the background area from the digital image.

The features, functions, and advantages that have been discussed can be achieved independently in various examples or may be combined in yet other examples. Further details of the examples can be seen with reference to the following description and drawings.

BRIEF DESCRIPTION OF THE FIGURES

Examples, objectives and descriptions of the present disclosure will be readily understood by reference to the following detailed description of illustrative examples when read in conjunction with the accompanying drawings, wherein:

FIGS. 12-17 are example digital image representations illustrating step-wise modifications made to the images to perform functions shown in FIG. 8, according to an example implementation.

FIG. 20 is a flowchart illustrating an example of a computer-implemented image processing method, according to an example implementation.

DETAILED DESCRIPTION

Figure 1:
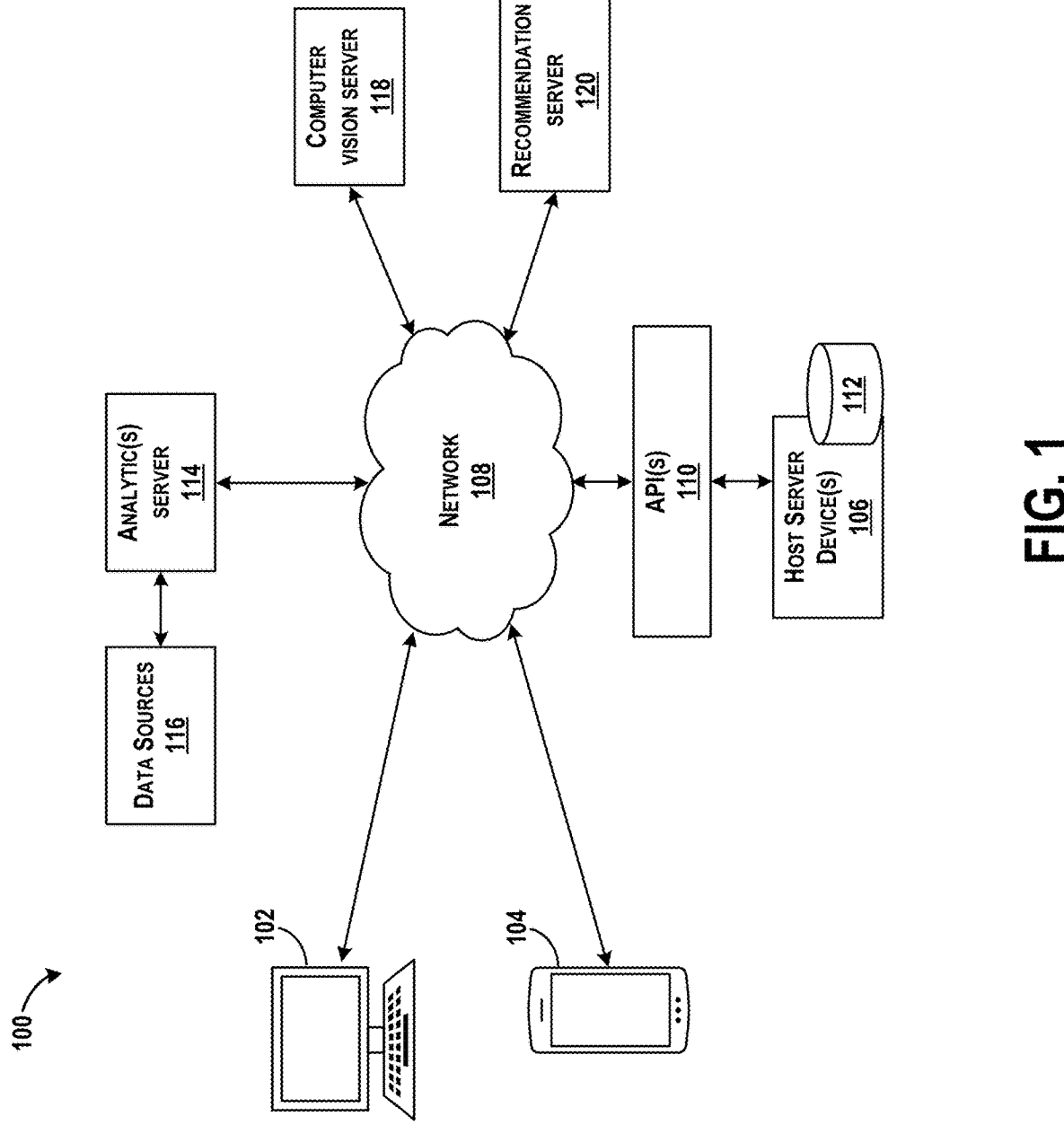
FIG. 1 is a block diagram illustrating an example of a networked computer system, according to an example implementation.

Disclosed examples will now be described more fully hereinafter with reference to the accompanying drawings. Several different examples are described and should not be construed as limited to all possible alternatives. Rather, these examples are described so that this disclosure is thorough and complete and fully conveys a scope of the disclosure to those skilled in the art.

Within examples, systems and methods described herein are beneficial to modify images and show how a person would look if they were to change their hair characteristics, such as transferring a hairstyle from a reference image to a digital image of a person resulting in a computer generated image. Example methods allow a person to virtually try-on variations of hairstyle or variations of modifications to hair on their face (e.g., beard, mustache, eyebrows, etc.) and generate a new photorealistic output image by modifying the hairstyle of a person's selfie image with the new chosen hairstyle or hair characteristics. A selfie image, for example, is a self-portrait photograph or image taken by a person of the person, such as with a camera facing the person. Example methods described herein are performed using selfie images, or images of a person taken in any manner.

Example described methods require an image of the person, and a reference image illustrating a hairstyle. Hair on a person in the selfie image is removed, and a hairstyle a person in the reference image is extracted, morphed, and pasted in place of hair in the selfie image. The modified image is fed into a generative neural network, such as a generative adversarial network (GAN), to improve a photorealism look of the modified image. For example, the GAN generates an output digital image of the person showing how the person would look with a transfer of the hairstyle to himself or herself. Face swap and inpainting are further applied to the output image to improve fidelity and to preserve identity of the person in the output image.

Thus, examples described herein enable a user to virtually try-on a new hairstyle by generating a new photorealistic image that changes the hairstyle of the user's selfie with a model's hairstyle.

The systems and methods described herein provide technological improvements that are particular to computer technology, for example, those concerning computer vision, computer graphical representation, and image processing. Computer-specific technological problems, such as modifying a digital image, can be wholly or partially solved by implementations of this disclosure. For example, implementation of this disclosure allows for many types of media (including both visual and non-visual) that is indicative of or includes a face of a person to be modified according to inputs to identify a face area and a background area, and then to modify hair on the face area according to received inputs. Processing includes using a generative neural network to modify the image, and then extracting a face area of an original image to use for combination with the modified image to preserve identity of the person.

Implementations of this disclosure thus introduce new and efficient improvements in the ways in which image processing is offered to perform custom modifications to hair that take into photorealistic features, as well as processing speed. The image processing utilizes an end-to-end pipeline that performs modifications of the image via execution of a generative neural network in a single iteration, thus, reducing time to generate a modified output image.

The systems and methods of the present disclosure further address problems particular to computer networks, for example, those concerning processing of visual media (including a face of a user) across multiple computers or through use of neural networks. These computing network-specific issues can be solved by implementations of the present disclosure. For example, in an instance where a user consents to use of the visual media including the face of the user, such data may be used for performing modifications to the image through machine learning algorithms executed by computer networks. In any situations in which systems described herein collect personal information about users, or process information to generate personal information of user, the users may be provided with opportunities to control whether the systems proceed to collect the user information. In addition, some user data may be processed before stored or used so that personally identifiable information is removed. Furthermore, in some examples, a user has further capabilities to request for deletion of user data at any time.

Referring now to the figures, FIG. 1 is a block diagram illustrating an example of a networked computer system 100, according to an example implementation. The networked computer system 100 includes one or more client devices 102 and 104 coupled to one or more host server device(s) 106 via a network 108. The network 108 represents one or more (or any combination of) local area networks (LANs), wide area networks (WANs), cellular networks, and/or other networks using any of wired, wireless, terrestrial microwave, or satellite links, and may include the public Internet or a private Intranet.

Within examples, the client devices 102 and 104 are one of a special purpose data processor, a general-purpose computer, smartphone, tablet, a computer system, or a group of networked computers or computer systems configured to perform steps or modes of methods described herein. Further examples of the client devices 102 and 104 may include, without limitation, handheld computers, wearable devices, laptop computers, desktop computers, servers, portable media players, gaming devices, in-store kiosks, and so forth. According to one example, the client devices 102 and 104 are built on a personal computer platform, such as the Apple® or Android® platform. Although FIG. 1 illustrates two of the client devices 102 and 104, the networked computer system may include fewer or more of the client devices 102 and 104 operating at any time.

The host server devices(s) 106 may include any number of computers, virtual machine instances, and/or data centers that are configured to host or execute one or more instances of host applications. The host server devices(s) 106 may be involved, directly or indirectly, in processing requests received from the client devices 102 and 104. The host server devices(s) 106 comprise, for example, one or more of a network device, a web server, an application server, a database server, etc. A collection of the host server devices(s) 106 may be configured to implement a network-based service. For example, a provider of a network-based service configures one or more of the host server devices(s) 106 and host applications (e.g., one or more web servers, application servers, database servers, etc.) to collectively implement a network-based application.

The client devices 102 and 104 communicate with one or more host applications at the host server devices(s) 106 to exchange information. The communication between the client devices 102 and 104 and a host application, for example, is based on the Hypertext Transfer Protocol (HTTP) or any other network protocol. Content delivered from the host application to the client devices 102 and 104 includes, for example, HTML documents, media content, etc. The communication between the client devices 102 and 104 and a host application includes sending various requests and receiving data packets. For example, the client devices 102 and 104 or an application running on the client devices 102 and 104 initiate communication with a host application by making a request for a specific resource (e.g., based on an HTTP request), and the host server devices(s) 106 respond with the requested content stored in one or more response packets.

Thus, one or more client applications may be executed at the client devices 102 and 104. Some applications executing at the client devices 102 and 104 may implement one or more application programming interfaces (APIs) 110. The APIs 110, for example, process inputs and control outputs of the client devices 102 and 104. For example, a client application executing at the client devices 102 and 104 accesses the host server device(s) 106 via the API 110 to retrieve configuration parameters for a particular requested image processing platform that performs functions, such as, hair modification of a person in a digital image. The client application then uses local image processing libraries along with retrieved configuration parameters to generate visual media in response to a request by the host server device(s) 106.

The APIs 110 serve as an interface between the client devices 102 and 104 and the host server device(s) 106. One or more repositories and/or databases 112, which support certain utilities, store content required for implementing the image processing platform described herein, and is accessible by the host server device(s) 106. For example, the databases 112 store host applications, content (e.g., images/video), data related to image processing (e.g., image processing libraries, computer graphics, predefined visual effects, etc.), information relevant to the users (e.g., registration information or usage statistics), metadata, and any other data used in implementing the techniques described herein.

Thus, in some examples, techniques described herein are provided by an image processing platform that is made accessible via a website or an application via the API 110. Alternatively, or in addition, techniques described herein are offered as a platform product directly implementable on various devices or systems.

The networked computer system 100 also includes an analytic(s) server 114. The analytic(s) server 114 performs analytics on data related to usage behavior of the networked computer system 100. Such analytics may support other services including product recommendations and targeted marketing.

The networked computer system 100 also includes one or more data sources 116 accessible by the analytic(s) server 114. The data sources 116 generally refer to any sources from which data is received to implement features described herein. As a few illustrative examples, the data sources 116 include makeup product vendors, manufacturers, retailers, etc., content providers/licensing services, modeling services, and machine generated data sources such as server log files, activity log files, configuration files, messages, network packet data, performance measurements, sensor measurements, and the like.

The networked computer system 100 also includes a computer vision server 118. The computer vision server 118 is in communication with the client devices 102 and 104 and the host server device(s) 106 via the network 108 to receive visual media such as a digital image or digital video including a face, a body, or a portion of a face or body of a user, and processes the visual media to generate information for a number of different image processing functions. Within examples, the visual media includes one or more of a digital image, multiple frames of images, video, etc. Within some examples, the images include visible images (red, green, blue color images), and in other examples the images include multi or hyperspectral images (such as infrared images).

The computer vision server 118 includes computational ability to perform computer vision tasks for identifying and localizing a face in an image (e.g., using any number of algorithms such as the classical feature-based cascade classifier using the OpenCV library or a Multi-task Cascade convolutional neural network (MTCNN) via the MTCNN library) to find coordinates of the face in the image or demarcating an extent of the face (e.g., with a bounding box). Following, the computer vision server 118 identifies landmarks and regions on the face (e.g, nose, eyes, lips, etc.) as well as landmarks of other features in the image include area identified as hair on the face or on a head of the person through any number of algorithms or through use of pre-trained models in a machine learning algorithm. The computer vision server 118 then outputs, to the host server device(s) 106 and/or to the client devices 102 and 104, information for each identified component of the image.

The networked computer system 100 also includes a recommendation server 120. The recommendation server 120 can include or have access to a database containing product information, beauty services information, etc., which is accessible via the network 108 by the host server device(s) 106. The host server device(s) 106 then uses information from the output of the computer vision server 118 to select or receive an applicable product, entity, or service from the recommendation server 120 that would be applicable to features of the user detected in the visual media.

Figure 2:
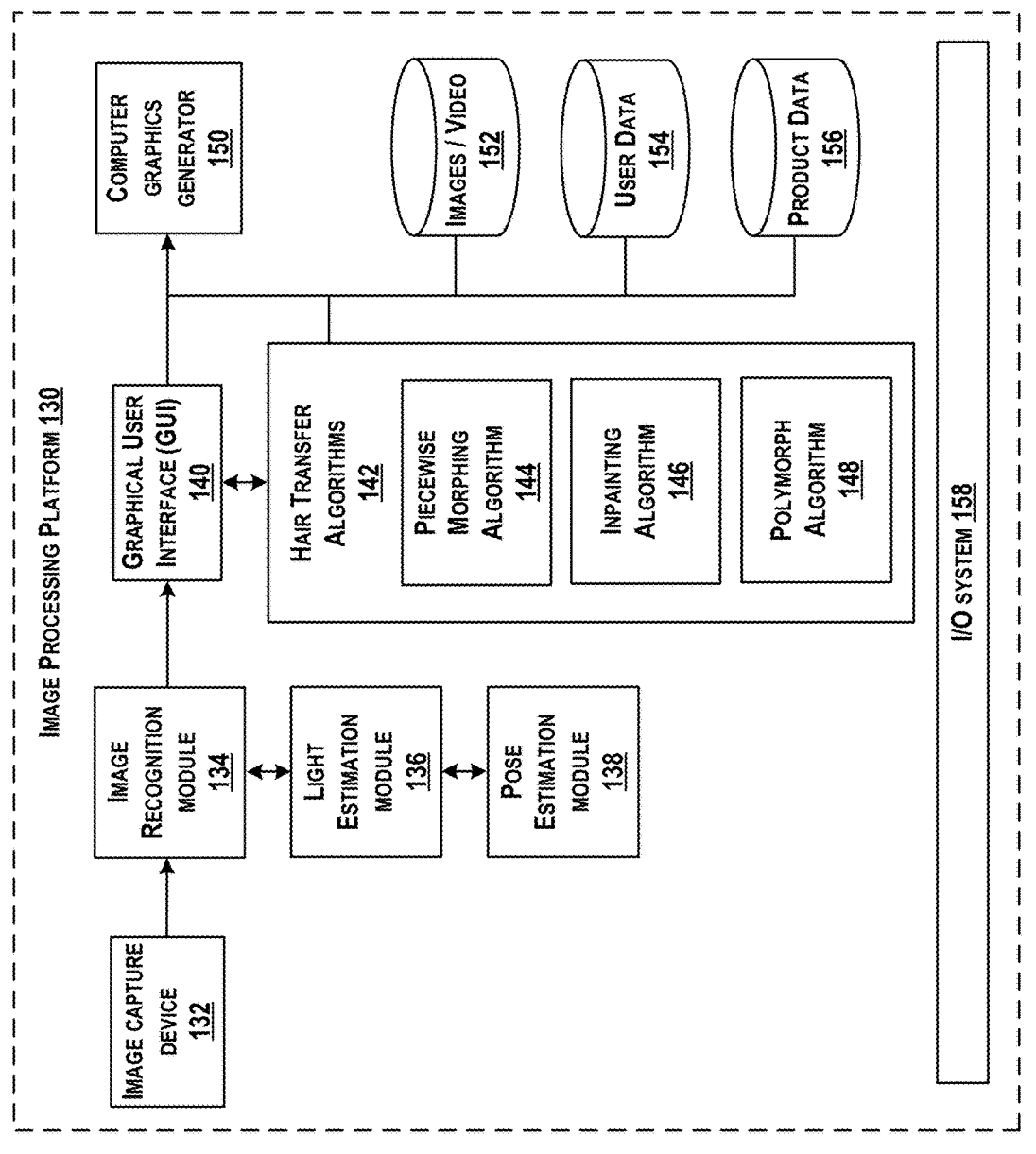
FIG. 2 illustrates a block diagram of an image processing platform, according to an example implementation.

FIG. 2 illustrates a block diagram of an image processing platform 130, according to an example implementation. Within examples, some or all of the components of the networked computer system 100 perform some functions of the image processing platform 130. Depending upon a particular implementation, various components described with respect to FIG. 2 are implemented at a single computing device (e.g., the host server device(s) 106 or one of the client devices 102 and 104) or distributed across several computing devices or servers. In some examples, certain functionalities of the image processing platform 130 (e.g., image capture) are performed at one of the client devices 102 and 104 while other functionalities (e.g., image recognition) are performed at a remote server device, such as the computer vision server 118.

Figures 3, 4:
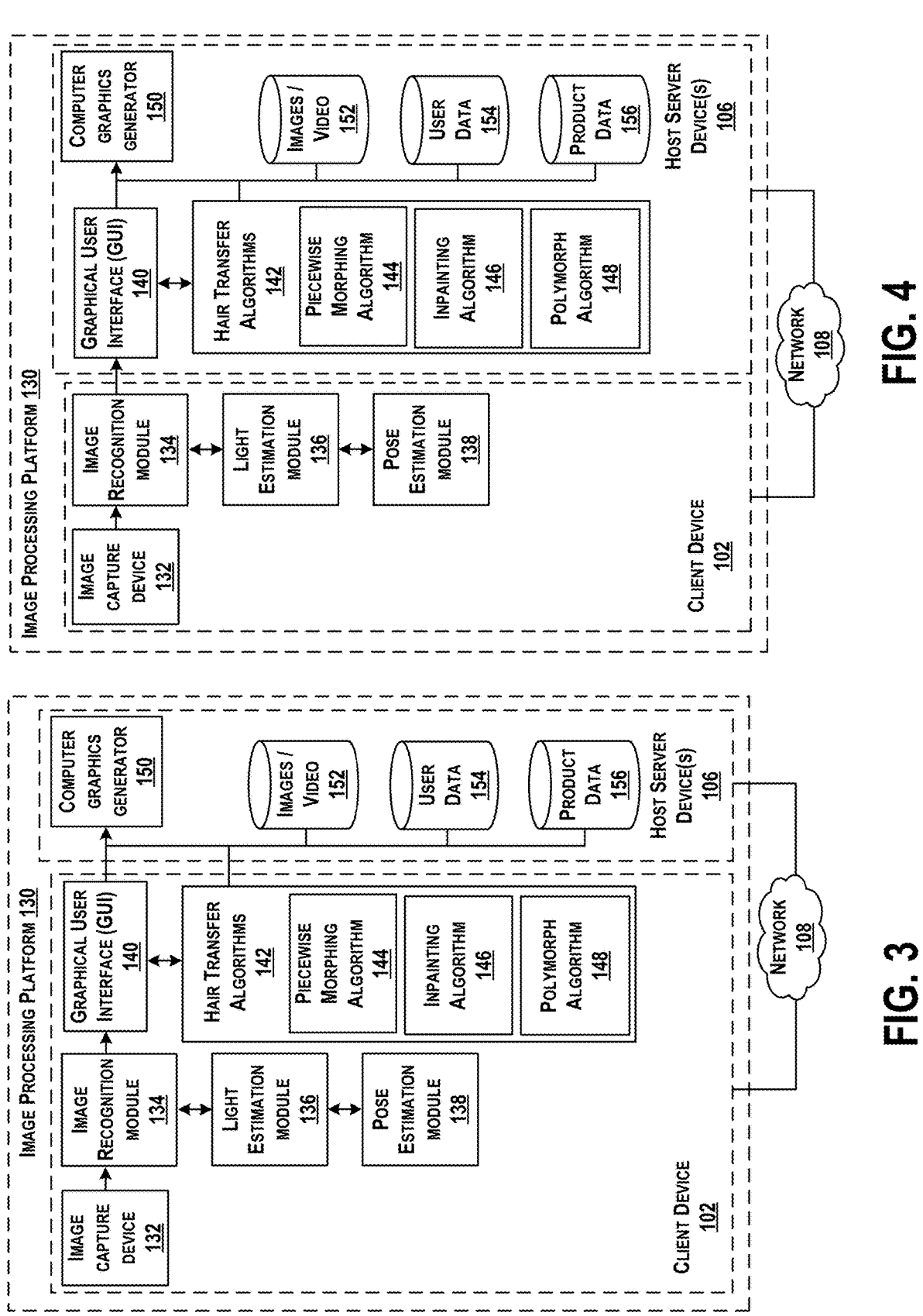
FIG. 3 illustrates a block diagram of an example implementation of the image processing platform, according to an example implementation, in which some components described with respect to FIG. 2 are instantiated at the client devices and some components are instantiated at the host server device(s), and in which the client device and the host server device(s) are communicatively coupled via the network.
FIG. 4 illustrates a block diagram of another example implementation of the image processing platform, according to an example implementation, in which other components described with respect to FIG. 2 are instantiated at the client devices and other components are instantiated at the host server device(s), and in which the client device and the host server device(s) are communicatively coupled via the network.

FIG. 3 illustrates a block diagram of an example implementation of the image processing platform 130, according to an example implementation, in which some components described with respect to FIG. 2 are instantiated at the client devices 102 and some components are instantiated at the host server device(s) 106, and in which the client device 102 and the host server device(s) 106 are communicatively coupled via the network 108.

FIG. 4 illustrates a block diagram of another example implementation of the image processing platform 130, according to an example implementation, in which other components described with respect to FIG. 2 are instantiated at the client devices 102 and other components are instantiated at the host server device(s) 106, and in which the client device 102 and the host server device(s) 106 are communicatively coupled via the network 108.

The example implementations shown in FIGS. 3 and 4 are provided for illustrative purposes only, and components of the image processing platform 130 are be distributed differently in other examples.

With reference to FIGS. 2-4, some components are described as "modules", "engines", or "generators", and such components include general purpose or special purpose hardware (e.g., general or special purpose processors), firmware, and/or software embodied in a non-transitory computer-readable (storage) medium for execution by one or more processors to perform described functionality.

The image processing platform 130 includes an image capture device 132 in a form of software and/or hardware for capturing media (images and/or video) at one of the client devices 102 and 104. For example, the image capture device 132 includes a digital camera including one or more optical sensors (e.g., charge-coupled devices (CCD), complementary metal-oxide semiconductor (CMOS) phototransistors, etc.) for conversion of received light to visual media such as digital information. In another example, the image capture device 132 includes software for pre-processing raw image data.

Within examples, the image processing platform 130 enables capture of many different kinds of media that includes or is indicative of a person and a face of a person. One type includes visual media, such as a single digital image, multiple digital images, and videos. Other types include non-visual media, such as infrared (IR) images or data, and hyperspectral images or data. Still other types of media include media captured based on the visible light spectrum or other spectral bands such as ultra-violet (UV). A number of media captured and a type of media captured depends on image capture sensors or devices available or included on the client devices 102 and 104. In examples where non-visual media is captured, such data is useful for further analysis of features included in media, such as features of a face to determine contours and other three-dimensional (3D) aspects.

An image recognition module 134 receives or retrieves the visual media (e.g., digital image) including a face area of a person and a background area from the image capture device 132, and processes the visual media to perform functions that may include: first, determining if a face is present or not; second, detecting a bounding box of the face; third performing detection of the facial features; and finally performing pre-processing of the digital image for at least one of aligning, cropping, and resizing the digital image.

The image processing platform 130 further includes a light estimation module 136 to evaluate one or more characteristics of illumination for the visual media. Based on one or more characteristics of illumination for the visual media not meeting a quality level, the light estimation module 136 requests a new visual media including the face of the user with an adjustment to lighting in an environment of the user.

The image processing platform 130 further includes a pose estimation module 138 to evaluate one or more characteristics of a pose of the face of the user in the visual media. Based on the one or more characteristics of the pose of the face of the user in the visual media indicating a threshold amount of the face of the user is not included in the visual media, the pose estimation module 138 requests the user to adjust a position of the face for capture of new visual media.

The image processing platform 130 further includes a graphical user interface (GUI) 140 that allows users to interact with the client devices 102 and 104 through graphical icons and audio indicators, typed command labels or text navigation. The GUI 140 includes interactive elements selectable for providing input by a user or receiving outputs by the GUI 140. The GUI 140 operates to provide information based on hair transfer algorithms 142 executable to identify and/or modify a feature of hair on the person in a digital image. The hair transfer algorithms 142 include a piecewise morphing algorithm 144, an inpainting algorithm 146, and a polymorph algorithm 148. More or fewer hair transfer algorithms 142 may be included as well. Details of each of the hair transfer algorithms 142 are discussed more fully below.

The image processing platform 130 further includes a computer graphics generator 150 to generate or select computer graphics applicable for display by the GUI 140 to be representative of modifications to hair on the person in the digital image and/or to be representative of other features for inclusion within an output composite image. Within one example, the GUI 140 is operated to overlay or combine computer graphics output by the computer graphics generator 150 at locations onto the visual media including the face of the user corresponding to areas for modification of hair on the person, or at locations onto the visual media including a body of the user corresponding to modifications of clothing on the person.

The image processing platform 130 further includes or has access to databases such as an images/video database 152 that stores the visual media received according to permissions set by the user, a user data database 154 that stores user data (e.g., age, preferences, goals, past purchases, navigation history, etc.) according to permissions set by the user, and a product data database 156 that stores details of products.

In some examples, when permissions are set accordingly by the user, the image recognition module 134 is operated to retrieve visual media including a face area of a person from the images/video database 152 (rather than receiving a digital image in real-time or substantially real-time from the image capture device 132) for access to pre-existing visual media to process accordingly.

The image processing platform 130 further includes an input/output (I/O) system 158 that couples components of the image processing platform 130 to input and output devices of any type. For example, for components of the hair modification platform 130 that are instantiated at one of the client devices 102 and 104, the I/O system 158 couples to a touch screen display device through which outputs are displayed and user inputs (e.g., touch gestures) are received, the image capture device 132 through which image data is received, and/or a network device through which data is transmitted/received over the network 108. Similarly, for components of the image processing platform 130 that are instantiated at the host server device(s) 106, the I/O system 158 couples to a network device through which data is transmitted/received over the network 108.

Figure 5:
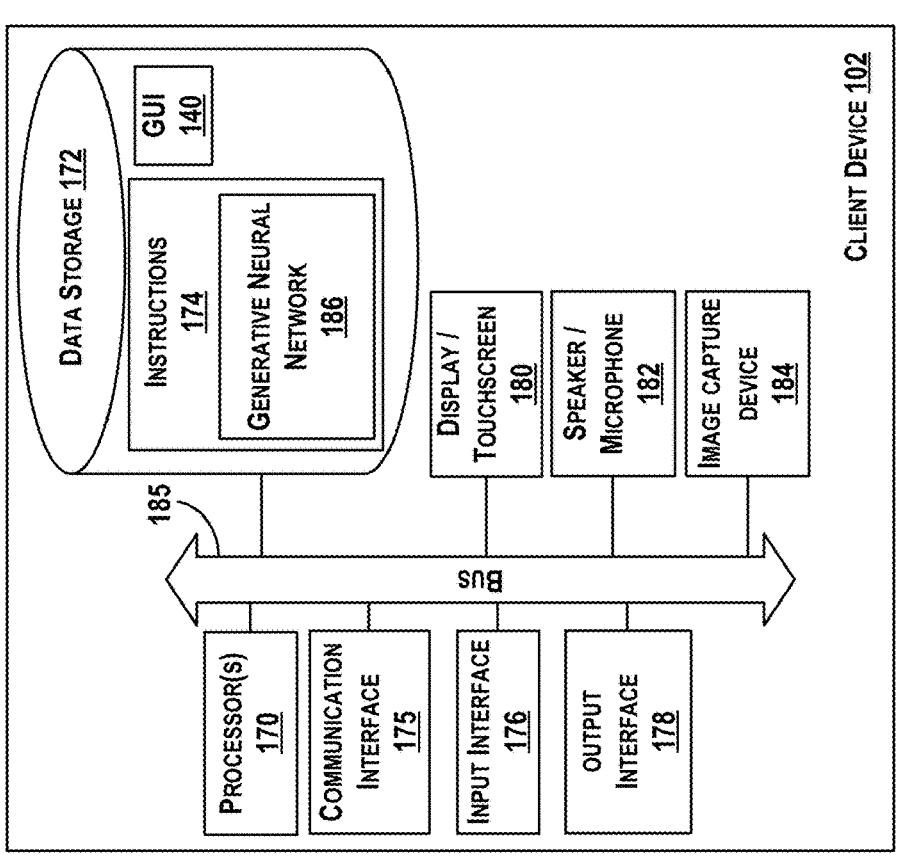
FIG. 5 illustrates a simplified block diagram of the client device, according to an example implementation.

FIG. 5 illustrates a simplified block diagram of the client device 102, according to an example implementation. FIG. 5 does not necessarily show all of the hardware and software modules included in the client device 102, and omits physical and logical connections that will be apparent to one of ordinary skill in the art after review of the present disclosure. Although FIG. 5 illustrates components for the client device 102, the features shown in FIG. 5 are illustrative as components of any client device for use in the networked computer system 100.

The client device 102 includes one or more processor(s) 170, and a non-transitory computer-readable media (data storage) 172 storing instructions 174, which when executed by the one or more processor(s) 170, causes the client device 102 to perform functions (as described below). To perform functions, the client device 102 includes a communication interface 175, an input interface 176, an output interface 178, a display/touchscreen 180, a speaker/microphone 182, and an image capture device 184, and each component of the client device 102 is connected to a communication bus 185. The client device 102 may also include hardware to enable communication within the client device 102 and between the client device 102 and other devices (not shown). The hardware may include transmitters, receivers, and antennas, for example.

The communication interface 175 is a wireless interface and/or one or more wireline interfaces that allow for both short-range communication and long-range communication to one or more networks or to one or more remote devices. Such wireless interfaces provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface

175 is configured to receive input data from one or more devices, and configured to send output data to other devices.

The data storage 172 includes or takes the form of memory, such as one or more computer-readable storage media that can be read or accessed by the one or more processor(s) 170. The computer-readable storage media includes volatile and/or non-volatile storage components, such as optical, magnetic, organic or other memory or disc storage, which can be integrated in whole or in part with the one or more processor(s) 170. The non-transitory data storage 172 is considered non-transitory computer readable media. In some examples, the non-transitory data storage 172 is implemented using a single physical device (e.g., one optical, magnetic, organic or other memory or disc storage unit), while in other examples, the non-transitory data storage 172 is implemented using two or more physical devices. The non-transitory data storage 172 thus is a computer readable medium, and instructions 174 are stored thereon. The instructions 174 include computer executable code.

The one or more processor(s) 170 include a general-purpose processor or special purpose processor (e.g., digital signal processors, application specific integrated circuits, etc.). The one or more processor(s) 170 receives inputs from the communication interface 175 as well as from other components (the display/touchscreen 180, the speaker/microphone 182, or the image capture device 184), and processes the inputs to generate outputs that are stored in the non-transitory data storage 172. The one or more processor(s) 170 are configured to execute the instructions 174 (e.g., computer-readable program instructions) that are stored in the non-transitory data storage 172 and are executable to provide the functionality of the client device 102 described herein.

In some examples, the processor(s) 170 take the form of graphical processing units (GPUs) or neural engine cores including a cluster of specialized computing cores optimized for energy-efficient execution of deep neural networks (e.g., specialized microprocessors focused on running ML models). Use of specialized computing components offers technical advantages of lower electricity usage due to processor computing efficiencies.

The input interface 176 is used to enter data or commands and can include, for example, a keyboard, a scanner, a user pointing device such as, for example, a mouse, a trackball, or a touch pad, or may further include the touchscreen or microphone.

The output interface 178 outputs information for reporting or storage, and thus, the output interface 178 may be similar to the communication interface 175 and can be a wireless interface (e.g., transmitter) or a wired interface as well.

The instructions 174 are further shown to include a generative neural network 186. Thus, the instructions 174 are further executable to perform functions of a generative neural network 186, for example. The generative neural network 186 performs functions of generative modeling in an unsupervised learning task in machine learning that involves discovering and learning regularities or patterns in input data in such a way that the model is used to generate or output new examples that plausibly could have been drawn from the original dataset. The generative neural network 186 thus utilizes machine learning using a model to make a prediction, and the machine learning requires a training dataset to train a model comprised of multiple examples.

In one example, the generative neural network is a generative adversarial network (GAN). A GAN trains a generative model by framing the problem as an unsupervised learning problem with two sub-models: the generator model trained to generate new examples, and a discriminator model that classifies examples as either real (from the domain) or fake (generated). The two models are trained together in a zero-sum game, adversarial, until the discriminator model is successful about half the time, meaning the generator model is generating plausible examples. The GAN is beneficial, for example, to generate realistic examples across a range of problem domains including image-to-image translation tasks and generating photorealistic outputs.

The generator model takes a fixed-length random vector as input and generates a sample in the domain. The vector is drawn from a Gaussian distribution, and the vector is used to seed the generative process. After training, points in this multidimensional vector space will correspond to points in the problem domain, forming a compressed representation of the data distribution. The vector space is referred to as a latent space, or a vector space comprised of latent variables. Latent variables, or hidden variables, are those variables that are important for a domain but are not directly observable. The latent space provides a compression or high-level concepts of the observed raw data such as the input data distribution. In the case of the GAN, the generator model applies meaning to points in a chosen latent space, such that new points drawn from the latent space can be provided to the generator model as input and used to generate new and different output examples.

Within examples described herein, the generative neural network 186 is utilized to modify a digital image, based on input parameters or based on receipt of a reference image, to create a modified digital image in which a feature of hair on the person is modified. Details of the modification and transfer process are described more fully below.

Figure 6:
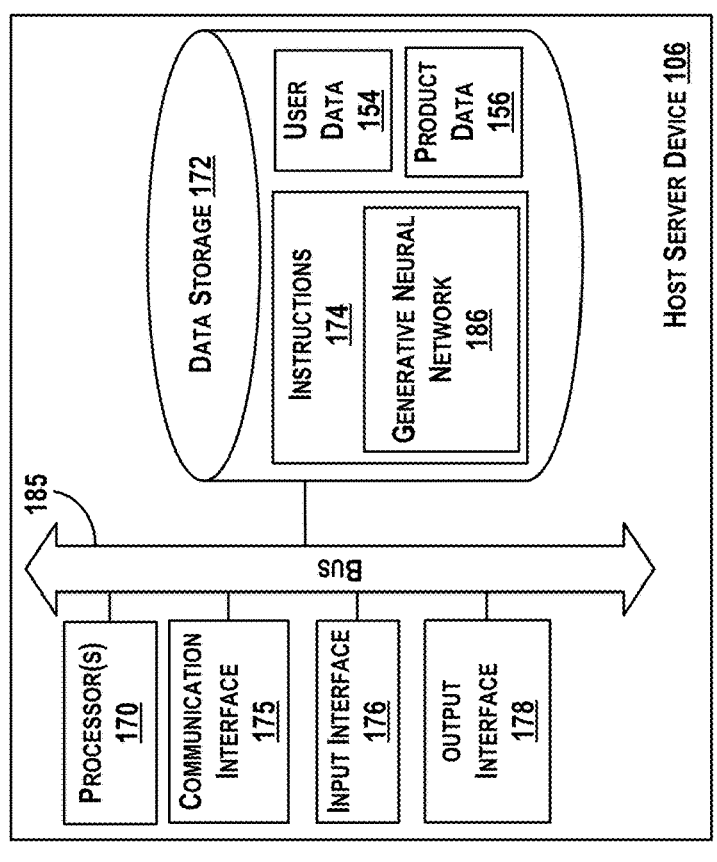
FIG. 6 illustrates a simplified block diagram of the host server device, according to an example implementation.

FIG. 6 illustrates a simplified block diagram of the host server device 106, according to an example implementation. Like the illustration in FIG. 5, FIG. 6 does not necessarily show all of the hardware and software modules included in the host server device 106. Further, similar components illustrated in FIG. 6 that have been described with reference to FIGS. 2-5 are not repeated here.

The host server device 106 can take the form of a server computer, a client computer, a personal computer (PC), a user device, a mobile phone, a tablet, a laptop computer, a set-top box (STB), a thin-client device, or any machine capable of executing a set of instructions (sequential or otherwise) that specify actions to be taken by that machine.

Within one example, in operation, when the instructions 174 are executed by the one or more processor(s) 170 (of the client device 102 or in other examples of the host server device 106, or still in other examples of a combination of the client device 102 and the host server device 106), the one or more processor(s) 170 is caused to perform functions for an image processing method, such as via operation of the image processing platform 130. The functions include receiving a digital image including a face area of a first subject and a background area (such as from the image processing device 132), receiving a reference image of a second subject (such as from the GUI 140), modifying the digital image based on the reference image utilizing a generative neural network to create a modified digital image in which a feature of the second subject is transferred to the first subject, extracting a feature area from the modified digital image including a portion of the modified digital image with the feature of the second subject transferred to the first subject, and the face area of the first subject and the background area from the digital image, and combining the face area of the first subject and the background area from the digital image with the feature area from the modified digital image to create a composite modified digital image that includes data representing the feature of the second subject transferred to the first subject from the modified digital image and data representing the face area of the first subject and the background area from the digital image.

Figure 7:
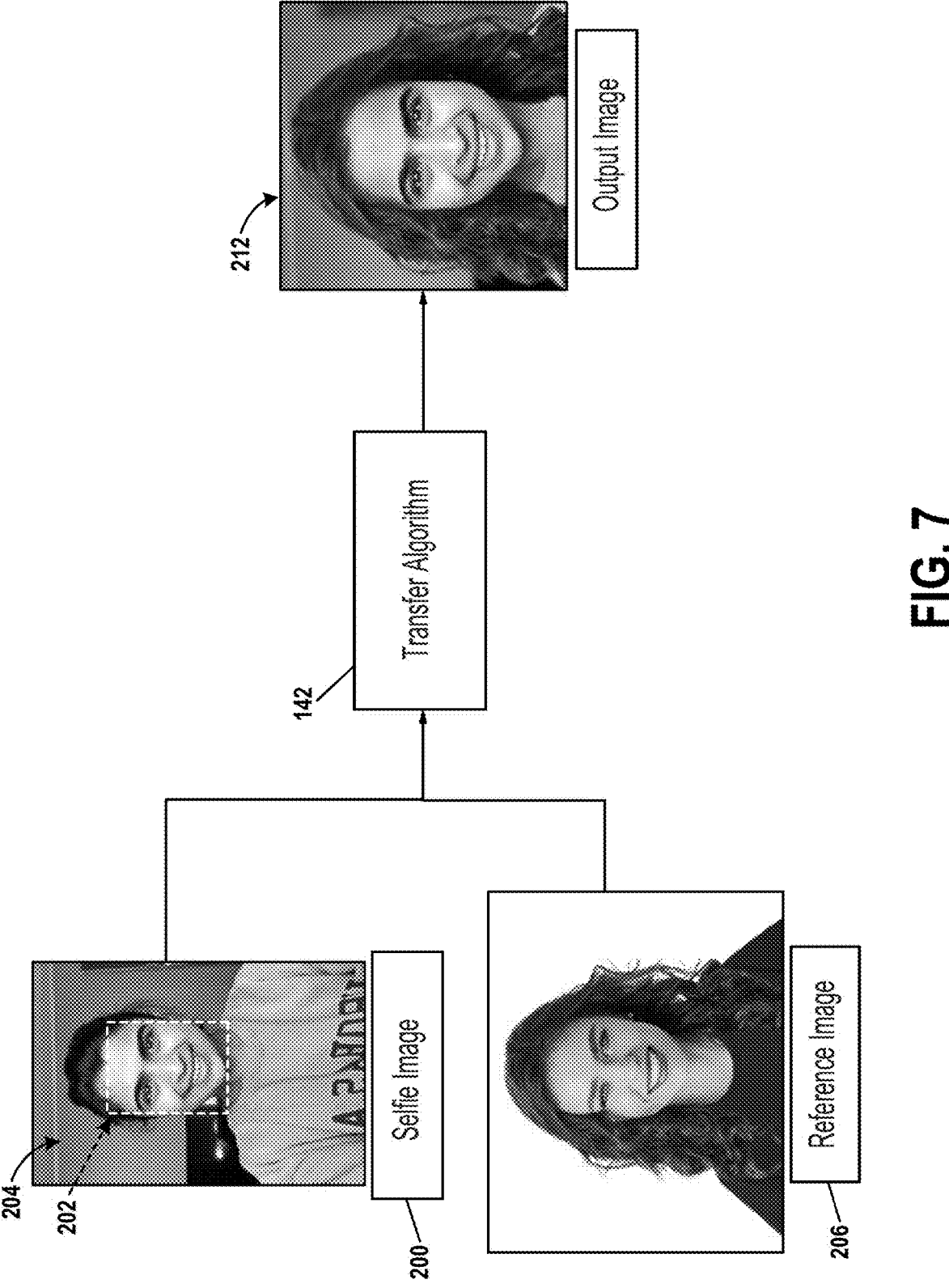
FIG. 7 is a workflow diagram illustrating example functions of the piecewise morphing algorithm and the inpainting algorithm, according to an example implementation.

FIG. 7 is a workflow diagram illustrating example functions of the hair transfer algorithms 142, according to an example implementation. Generally, the workflow begins with receiving a digital image 200 including a face area 202 of a first subject and a background area 204. Next, a reference image 206 of a second subject is received.

Following, the hair transfer algorithms 142 are executed to modify the digital image 200 based on the reference image 206 utilizing a generative neural network to create a modified digital image in which a feature of the second subject is transferred to the first subject, and an output image 212 is created by combining the face area 202 of the first subject and the background area 204 from the digital image 200 with the feature area from the modified digital image to create a composite modified digital image that includes data representing the feature of the second subject transferred to the first subject from the modified digital image and data representing the face area 202 of the first subject and the background area 204 from the digital image 200.

In the example shown in FIG. 7, the feature of the second subject transferred to the first subject includes a hairstyle of the second subject shown in the reference image 206. Thus, the modified digital image (represented in FIG. 7 as the output image 212) includes the hairstyle from the reference image 206 combined with the face area 202 of the first subject and the background area 204 from the digital image 200.

Figure 8:
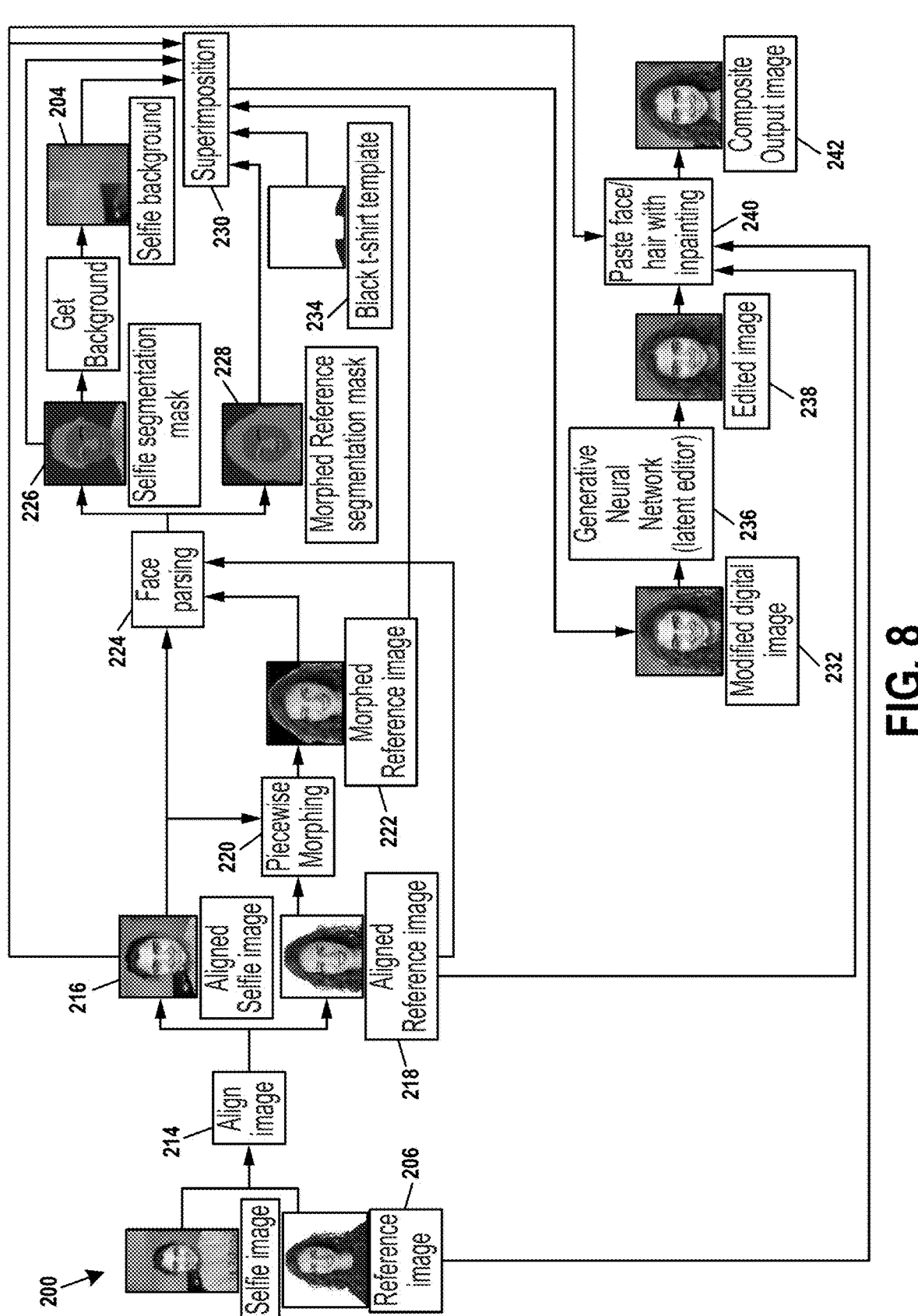
FIG. 8 is a detailed workflow diagram of the functions shown in FIG. 7, according to an example implementation.

FIG. 8 is a detailed workflow diagram of the functions shown in FIG. 7, according to an example implementation. Generally, the workflow begins with receiving the digital image 200 including the face area 202 of a first subject and the background area 204. Next, the reference image 206 of a second subject is received. Following, pre-processing of the digital image 200 and the reference image 206 for at least one of aligning, cropping, and resizing is performed, as shown at block 214. For example, the digital image 200 is cropped to be of a preset size and aligned such that the face of the person is in a center of the image to create an aligned selfie image 216, and the reference image 206 is similarly processed to create an aligned reference image 218.

Next, piecewise morphing 220 of the aligned reference image 218 is performed such that dimensions of components of the second subject are transformed into dimensions of components of the first subject to create a morphed reference image 222. As an example, a face and hair of the second subject in the aligned reference image 218 needs to be sized to fit the face area 202 of the first subject in the aligned selfie image 216. Thus, pixels of the face and hair in the aligned reference image 218 are morphed (e.g., morphing includes translation, rotation, and zoom modifications) to modify dimensions and account for fitting a shape of the face area 202 as imaged in the aligned selfie image 216 (e.g., if zoomed in or not, etc.).

Morphing is performed "piecewise" so as to modify on a pixel-by-pixel basis to account for changes in every pixel differently, or on a region-by-region basis to account for changes to regions of pixels differently. The piecewise morphing 220 thus accounts for changes in shape or dimensions of the face in the aligned reference image 218 to match dimensions of the face area in the aligned selfie image 216.

As an example of piecewise morphing, initially, a transformation is estimated that maps a face in the aligned reference image 218 to a face in the aligned selfie image 216. Once an estimate transformation is known (e.g., enlarge by two) to modify a face of the aligned reference image 218 to a face of the aligned selfie image 216, then a hair portion of the aligned reference image 218 is transformed in the same manner (e.g., to enlarge the hair). Thus, between the aligned selfie image 216 and the aligned reference image 218, first a face to face transformation is estimated and performed on the aligned reference image 218, and then the same transformation is applied to hair of the aligned reference image 218 to create the morphed reference image 222 that more closely matches dimensions (e.g., face shape) of the aligned selfie image 216.

Estimating only one transformation between faces of the aligned selfie image 216 and the aligned reference image 218 is one example. In other examples, multiple transformations are estimated between faces of the aligned selfie image and the aligned reference image 218, to estimate a specific and independent transformation for different regions of the faces. For example, between the aligned selfie image 216 and the aligned reference image 218, a transformation is estimated between a forehead region of the faces, a transformation is estimated between a nose region, and a transformation is estimated between a chin region. Other regions can be considered as well. In addition, in further examples, yet more transformations are estimated such as an independent transformation between each pixel of the aligned selfie image 216 and the aligned reference image 218. Any number of transformations between the aligned selfie image 216 and the aligned reference image 218 can be determined to morph the face of the aligned reference image to the face of the aligned selfie image.

When multiple transformations are estimated, a specific transformation to apply to the hair of the aligned reference image 218 depends on a location of the hair in the aligned reference image 218. For example, hair adjacent a cheek area is transformed using the cheek region transformation, and hair adjacent a forehead area is transformed using the forehead area transformation.

Thus, a transformation between the aligned reference image 218 and the aligned selfie image 216 is determined between faces of the aligned reference image 218 and the aligned selfie image 216, and then applied to both the face and hair of the aligned reference image 218 to create the morphed reference image 222. In sum, piecewise morphing includes modifying pixels of the aligned reference image 218, and therefore, dimensions of portions of the face and hair of the aligned reference image 218 are modified. Following, a face parsing 224 is performed creating, for example, a selfie segmentation mask 226 of the aligned selfie image 216 and a morphed reference segmentation mask 228 of the morphed reference image to identify location of different parts of face (e.g., neck, eyes, etc.). In one example, a deep neural network is applied for the face parsing 224 to segment the image of a face into semantic components such as, background, hair, body, neck, eyes, nose, mouth, etc.

Functions of the face parsing 224 (commonly referred to as facial semantic segmentation) are performed using a deep learning neural network, which is trained using training images of faces with labeled landmarks and regions. Semantic segmentation aims to label each pixel in an image such that pixels with same labels share certain characteristics. These characteristics can be divided into two categories: low level features (such as color uniformity), and high level features (such as semantic meaning, e.g., this patch of red pixels is a T-shirt). Many deep learning approaches exist for semantic segmentation, and for facial/head segmentation, the task of segmenting different areas of the face/head (e.g., such as ears, hair, nose, eyes) includes using a set of training data. In one example, each training image includes a pair of RGB images where one is an input (original) selfie image and the other stores corresponding labels. The labels are encoded in pseudo or false color. The labels encode many different areas of the face using RGB labels picked from an indexed color map, such as [R, G, B]=[0,0,0] is background; [R, G, B]=[255,0,0]=lips; [R, G, B]=[0,255,0] is eyes; [R, G, B]=[255,255,0] is hair, etc. Thus, execution of face parsing 224 results in the selfie segmentation mask 226 and the morphed reference segmentation mask 228 with areas of the images associated with the labeled areas of the training images.

Next, mask segmentation is performed of the aligned selfie image 216 to segment the background area 204. In addition, using the morphed reference segmentation mask 228, a hair area is extracted from the morphed reference image 222.

A superimposition 230 is them performed using the face area 204 of the first subject and the selfie background 204 with hair area from the morphed reference image 222 to create a modified digital image 232. To do so, a hair area from the morphed reference image 222 replaces a hair area on the original selfie face (e.g., with the face area of the person captured from the aligned selfie image 216 using the selfie segmentation mask 226), and a background on the selfie background 204 is put back as the original background as well. In addition, a clothing template 234 (e.g., a black t-shirt template) is used to paste onto the image for a base clothing over which the hair area from the morphed reference image 222 is positioned. The superimposition 230 includes an overlay of each digital component onto the same image. The modified digital image 232 thus includes a raw pixel superimposition of the aligned selfie image 216 with the hair area from the morphed reference image 222 and the clothing template 234, for example. The superimposition 230 results in modifying the digital image 200 to transfer hair of the second subject to the first subject.

The modified digital image 232 is not in final form yet. Rather, a blending of transferred hair onto the aligned selfie image 216 is required. To do so, the modified digital image 232 is further modified by utilizing a generative neural network 236, such as a GAN (e.g., latent editor), to create an edited digital image 238 in which the hair from the morphed reference image 222 is blended in more fully with the components of the aligned selfie image 216.

The generative neural network 236 projects the modified digital image 232 into a latent vector space to create a vector image (e.g., encoding the image into a vector format to convert the image from a pixel domain to a latent space domain), modifies the vector image based on the reference image to create a modified vector image (such that modifications occur in latent space), and inverts the modified vector image into the edited digital image 238 (e.g., to convert back into the pixel domain). The modifications of the vector image by the generative neural network 236 include usage of a generator model to generate modifications.

In general, the generative neural network 236 operates as an un-supervised learning model with two sub-models: a generator model that is trained to generate new examples, and a discriminator model that tries to classify examples as either real (from the domain) or fake (generated). The two models are trained together in an adversarial manner until the discriminator model is fooled about half the time, meaning the generator model is generating plausible examples. Within examples herein, the generative neural network 236 is trained with images including faces, and after training, new images are received and passed through the generative neural network 236 to understand and determine where in latent space the new image falls (referred as latent space encoding). Continued execution and training of the generative neural network 236 results in regions of latent space created where images are sorted based on hair features like a beard, bald, color, texture, long hair, etc. Each specific region of the latent space in the generative neural network 236 has a common factor. Then, using the generative neural network 236 to perform modifications between latent spaces results in solving the problem of finding a pathway between regions of the latent space.

Usage of the generative neural network 236 can result in an entanglement of independent factors when solving to find the pathway between regions of the latent space. In a specific example, for two images wherein one image has a person with short hair and the other image has a person with long hair, and the generative neural network 236 is executed to modify the short hair image to be a long hair image, such modifications of the image can also result in modifying other features of the image in addition to modifying the hair. When such an unintentional modification of other features occurs, it is commonly referred as entanglement of the results, where other factors become coupled with the changes being made.

A disentanglement process is then required. To achieve disentanglement, the latent space of the generative neural network 236 is desirably sampled with images with all possible variations of the hair features, and thus, large and diverse training image sets result in less entanglement and improved independence to modify each facial feature on its own.

In addition, a large dataset of training images additionally helps with creating accurate composite images for a diverse range of a population and ensures that hairstyles appear equally good across every possible type of hair and face combination. In one example, the training image sets accurately represent diverse samples across a demographic in a representative manner to ensure that accuracy of the generative neural network 236 operates well for all types of hairstyle and face combinations, including for all types of gender, skin color, hair color, face shapes, face characteristics, etc. The large dataset thus increases performance for more accurately representative and photo-realistic output composite images.

Figure 9A:
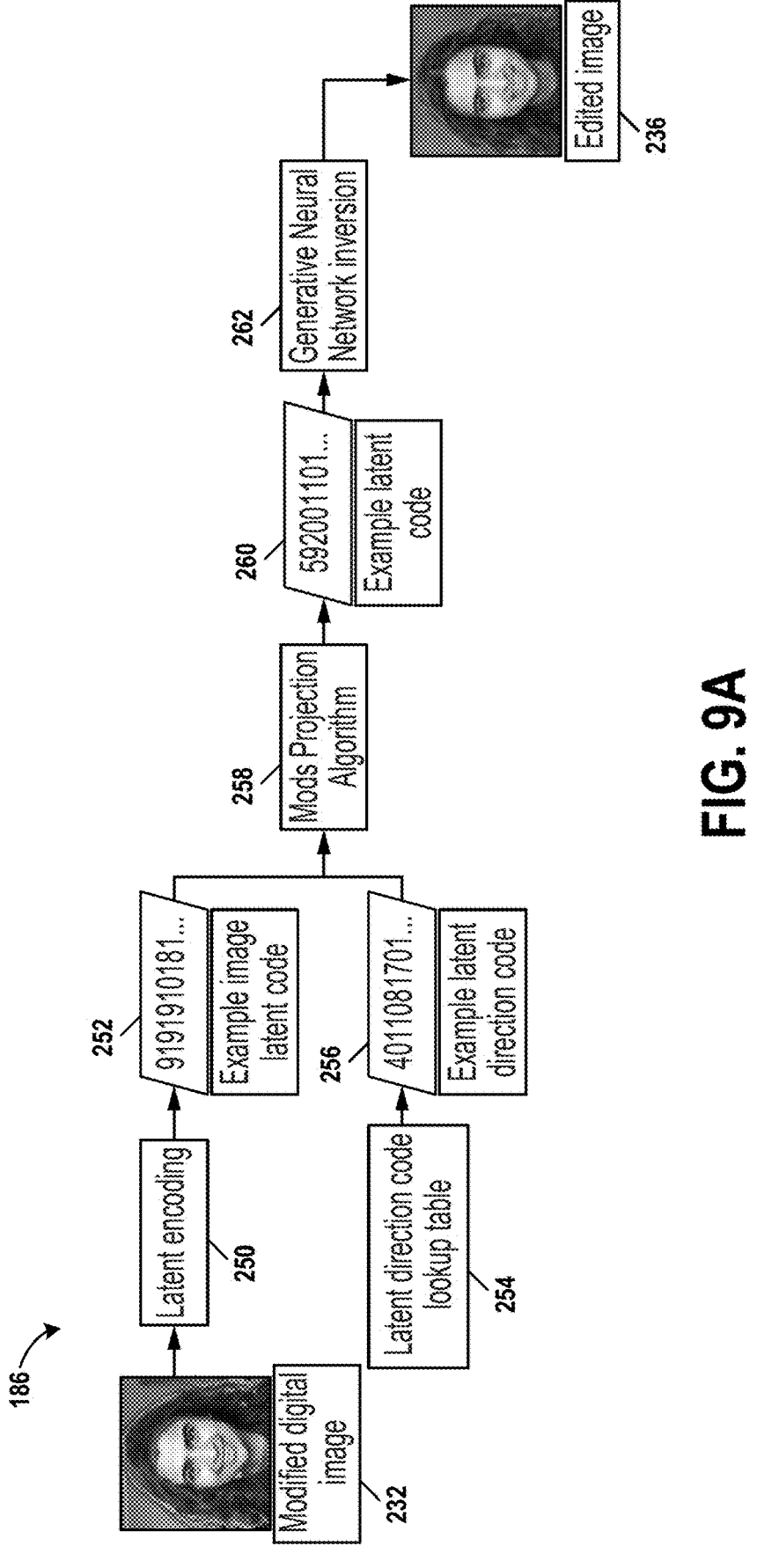
FIG. 9A is a detailed workflow diagram of the functions of the generative neural network shown in FIG. 8, according to an example implementation.

More details of processing by the generative neural network 236 are described with respect to FIG. 9A.

When the generative neural network 236 is executed to modify the modified digital image 232 in order to create the edited digital image 238, not only is the hair of the person modified but also other features of the digital image become modified due to the latent space changes that occur to the overall digital image. Thus, to restore the edited image 238 back to a photo-realistic view of the person, the changes to a face and background area need to be reversed. Within examples herein, to reverse those changes, the edited digital image 238 is thus further modified to replace the edited face and background area with the original face and background area. As a result, inpainting 240 is performed to paste the face area and the background area from the aligned selfie image 216 combined with the hair area from the morphed reference image 222 to create a composite output image 242 that includes data representing the feature of the second subject transferred to the first subject from the modified digital image 232 and data representing the face area of the first subject and the background area from the aligned selfie image 216.

The functions of inpainting 240 are performed to preserve identity of the person. Rather than executing the generative neural network 236 multiple times to perform many inversions and modifications in an iterative manner until features of the face of an output image are considered close enough to an original image, examples described herein execute the generative neural network 236 one time to perform modifications of the modified digital image 232, and then post-processing steps are performed to recover an identity of the person for a photo-realistic view in an output image. In this manner, the workflow is completed in one iteration and execution of the generative neural network 236, and that enables much less processing time to create an output image. Generally, execution of the generative neural network 236 (e.g., a deep neural network) can be a time-consuming process for processors, and thus, one iteration of the generative neural network 236 enables a virtual try-on of hair to be performed very quickly (e.g., on the order of seconds).

FIG. 9A is a detailed workflow diagram of the functions of the generative neural network 236 shown in FIG. 8, according to an example implementation. As mentioned above, initially, the generative neural network 236 projects the modified digital image 232 into a latent vector space to create a vector image and perform latent encoding 250 of the modified digital image 236 to obtain a latent code representation 252 (in FIG. 9A, the latent code representation is an example vector). A latent direction code lookup table 254 is referenced to create a latent direction code 256 most closely matching the image latent code 252. The latent direction code lookup table 254 contains latent codes per different hair types and is described in more detail with respect to FIG. 10.

Figure 9B:
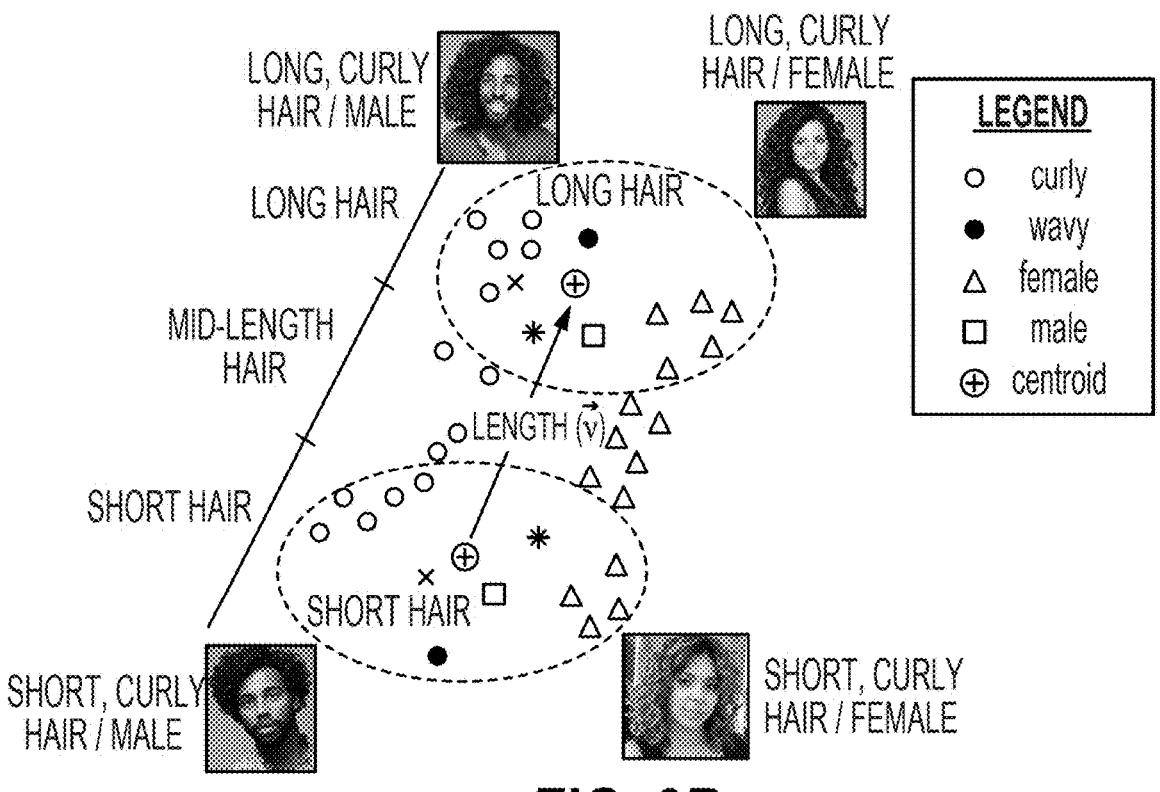
FIG. 9B is a conceptual illustration of a latent space representation of images and determination of a length vector, according to an example implementation.

A mods projection algorithm 258 is then executed to generate an output latent code 260 (described with respect to FIG. 9B). The new output latent code 260 is then fed to the generative neural network, as shown at block 262, to obtain an inverted image in the pixel domain as the edited image 236.

FIG. 9B is a conceptual illustration of a latent space representation of images and determination of a length vector, according to an example implementation. The latent space representation is of images of faces with hair of different lengths characterized as short hair, mid-length hair, and long hair. The images may include many different lengths of hair along a spectrum from short to long, for example, where images of short hair are represented by similar latent codes, images of mid-length hair are represented by similar latent codes, and images of long hair are represented by similar latent codes. Each image, however, varies due to hair and/or faces having different secondary attributes, such as curly, wavy, and different colors of hair as well as female, male, eye colors, skin colors, etc. of faces. In FIG. 9B, latent space representations of images having different attributes are illustrated by different shapes (e.g., circle represents curly, triangle represents female) as shown by the legend in FIG. 9B.

Each grouping of latent space representation of images has a centroid. A latent code direction between two regions of latent space is determined between centroids of the regions. For example, as shown in FIG. 9B, a length vector (v) can be computed between centroids of the short and long hair image latent spaces.

Figure 9C:
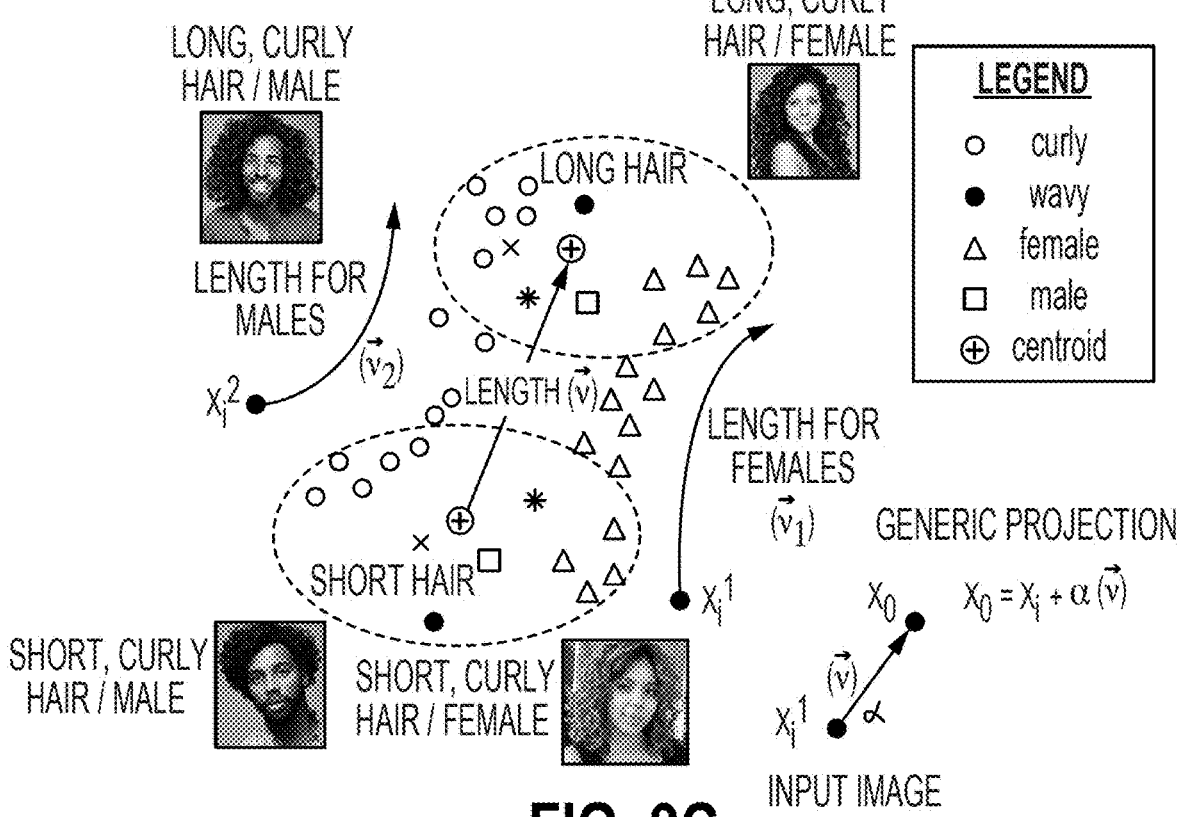
FIG. 9C is another conceptual illustration of the latent space representation of images and projection of an input image along a latent direction code, according to an example implementation.

FIG. 9C is another conceptual illustration of the latent space representation of images and projection of an input image along a latent direction code, according to an example implementation. In one example, for an input image having image latent code $x_i^1$, the mods projection algorithm 258 uses the length vector (v) as a generic direction latent code to project the image latent code $x_i^1$ in that direction to latent code $x_0$ according to equation:

$$x_0 = x_i + \alpha \vec{v}$$

where $\alpha$ is a weight representing an amount of movement in the direction of the latent code vector (where a varies between 0 and 1 where 0 represents no movement and 1 represents movement in the amount of the vector and along the length of the vector to the centroid region). Such a generic projection contemplates using the latent direction codes between centroid regions.

In another example, because different sub-regions of the latent space have different direction codes from the sub-region to a desired centroid space, a more optimized latent direction code is selected. For instance, in another example as shown in FIG. 9C, for an input image having image latent code $x_i^1$, the mods projection algorithm 258 first calculates distances, such as Euclidean distances, between the image latent code $x_i^1$ (e.g., image latent code 252 in FIG. 9A) and all the latent direction codes from the latent direction code lookup table 254. By comparing the computed distances, a latent direction code that is closest to the image latent code $x_i^1$ is determined, shown as $\vec{v}_1$ in FIG. 9C, and is referred to as the "Mods type" Source Latent Code. In this example, in FIG. 9C, the latent direction code is the length vector $\vec{v}_1$ from short hair to long hair along a direction for females. A Selfie Projection Latent Code is computed by projecting the Selfie Latent Code ($x_i^1$) onto the Direction Latent Code ($\vec{v}_1$) using the projection vector formula noted above.

To illustrate another example of the optimized latent code direction method, FIG. 9C illustrates another input image having image latent code $x_i^2$, the mods projection algorithm 258 first calculates distances, such as Euclidean distances, between the image latent code $x_i^2$ and all the latent direction codes from the latent direction code lookup table 254. By comparing the computed distances, a latent direction code that is closest to the image latent code $x_i^2$ is determined, shown as $\vec{v}_2$ in FIG. 9C. In this example, in FIG. 9C, the latent direction code is the length vector $\vec{v}_2$ from short hair to long hair along a direction for males. A Selfie Projection Latent Code is computed by projecting the Selfie Latent Code ($x_i^2$) onto the Direction Latent Code ($\vec{v}_2$) using the projection vector formula noted above.

Figure 10:
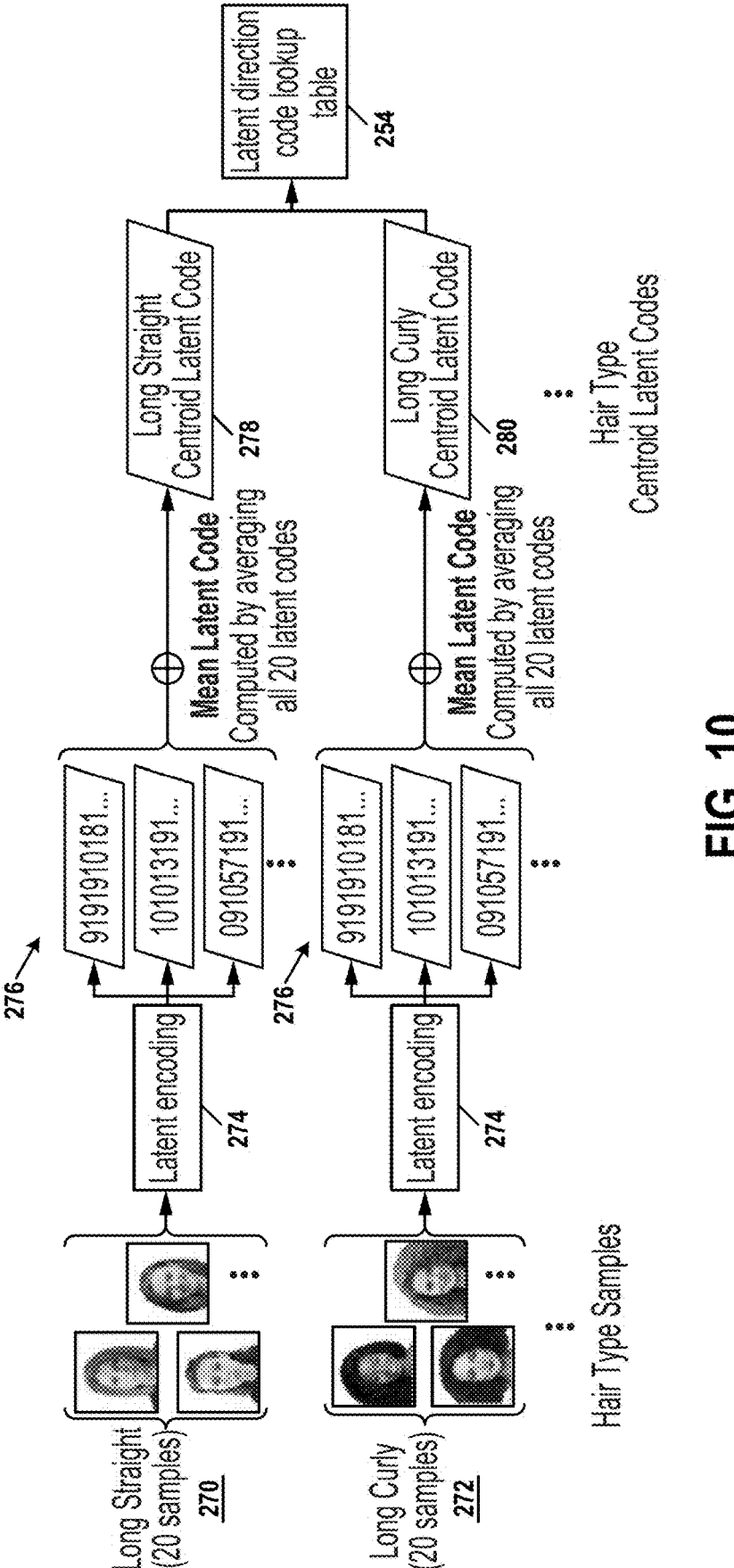
FIG. 10 is a detailed workflow diagram for creation of the latent direction code lookup table as shown in FIG. 9A, according to an example implementation.

FIG. 10 is a detailed workflow diagram for creation of the latent direction code lookup table 254 as shown in FIG. 9A, according to an example implementation. The latent direction code lookup table 254 includes a latent code for multiple different hairstyles to be used. To do so, a dataset of reference images is curated for many hairstyles, such as a dataset of reference images for long straight hair 270, a dataset of reference images for long curly hair 272, and so on for additional hairstyles offered. Each dataset of reference images is fed into a generative neural network latent encoder 274 to obtain latent codes 276 for each reference image. A "Mods type" centroid latent code 278 for long straight hair is calculated by averaging all of the latent codes for images from the dataset of reference image for long straight hair 270. Similarly, a "Mods type" centroid latent code 280 for long curly hair is calculated by averaging all of the latent codes for images from the dataset of reference image for long straight hair 272. The latent direction code lookup table 254 is created in a key-value pair format to store the new "Mods type" centroid latent codes, where the name of the "Mods type" is the key and the latent code is the value, for example.

Figure 11:
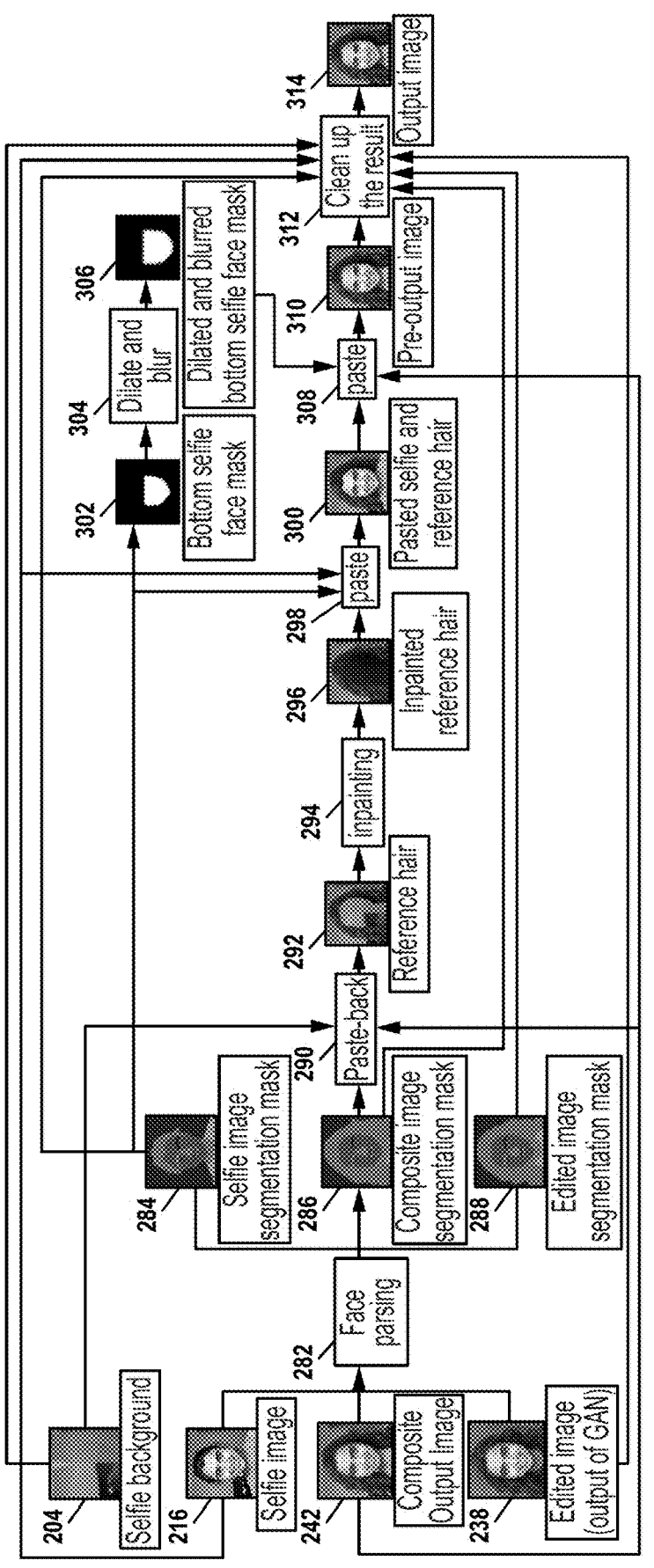
FIG. 11 is a detailed workflow diagram for the inpainting function as shown in FIG. 8, according to an example implementation.

FIG. 11 is a detailed workflow diagram for the inpainting function 240 as shown in FIG. 8, according to an example implementation. The inpainting function 240 is performed to preserve a photo-realistic view of the first subject. In FIG. 8, the inpainting function 240 is performed to paste a face of the first subject from the original digital image 200 with the hairstyle from the reference image 206 after performing modifications by the generative neural network 236 to generate the composite output image 242.

In FIG. 11, another example of the inpainting function 240 is illustrated to further enhance the composite output image 242. Different enhancements can be performed. In one example, further enhancements are performed for modifying a color balance of the composite output image 242 such that components from the digital image 200 in the composite output image 242 substantially match a perceived quality of components from the reference image 206 in the composite output image 242. In another example, further enhancements are performed for modifying a color balance of the composite output image 242 such that components from the reference image 206 in the composite output image 242 substantially match a perceived quality of components from the digital image 200 in the composite output image 242. In yet another example, further enhancements are performed for modifying a color balance of the composite output image 242 to maintain a perceived quality of the digital image 200 in the composite output image 242. The further enhancements thus match components from images where the images may have been captured having different qualities. The reference image 206 may be a high quality image captured with enhanced lighting, and the selfie image 200 may not be captured using the same enhanced lighting. Thus, color balancing is performed, and constraints can be applied to match the selfie image 200 to the reference image 206 or to match the reference image 206 to the selfie image 200. Image qualities may be downgraded or upgraded as needed. In some examples, a user is prompted to opt-in (e.g., offered a change setting) where a selection is made as to whether to maintain an original quality of the selfie image 200 or allow the quality of the selfie image 200 to be modified.

In some examples, the further enhancements are performed by determining first scene conditions of the digital image 200 that conditions include lighting features across the face area of the first subject, and modifying second scene condition of the composite output image 242 to substantially match the first scene conditions of the digital image 200.

Thus, functions of FIG. 11 for inpainting can be performed one or multiple times in the hair transfer algorithm, for example.

In FIG. 11, the inpainting function 240 receives the selfie background 204, the aligned selfie image 216, the edited image 238 (output from the generative neural network), and the composite output image 242 in order to generate an enhanced output image 314 in which a photo-realistic view of the person is maintained and any missing pieces of the composite output image 242 are completed. For example, if a hairstyle is transferred to the aligned selfie image 216 that is shorter than original hair on the first subject, there may be missing content in the image that needs to be filled. Thus, based on a comparison of the aligned selfie image 216, the edited image 238, and the composite output image 242, the inpainting function 240 is executed to fill in an area of the modified feature of hair within the edited image 238, and preserves an identity of the person for a photo-realistic view of the person in the output image 314.

The inpainting function 240 uses masks to detect where hair was present in the aligned selfie image 216 and is not now present in the composite output image 242, or where there was not hair present in the aligned selfie image 216 and there is now hair present in the composite output image 242 to detect areas (holes) needing completions in the digital image. Thus, image processing is used to paste-back hair of the composite output image 242 onto the selfie background 204, guided by segmentation masks. For example, face parsing 282 is applied to the input images to perform segmentation of the aligned selfie image 216 (to create a selfie image segmentation mask 284), segmentation of the composite output image 242 (to create a pasted inverted image segmentation mask 286), and segmentation of the edited image 2318 (to create an inverted image segmentation mask 288).

Using the masks applied to the input images, the background area and the modified feature of hair are segmented, as shown at block 290, into a reference hair image 292 that includes the hairstyle to be transferred (e.g., modified feature of hair). The paste-back block 290 further includes usages of segmentation masks to output the reference hair image 292 that includes hair and no face (e.g., region to be filed in) for input to inpainting. Segmentation mask creation and usage is the same functionality as described above for face parsing in FIG. 8, for example.

Inpainting at block 294 is performed to digitally fill in an area of the modified feature of hair within the reference hair image 292 to create an inpainted reference hair image 296. Following, the face area of the person from the aligned selfie image 216 is pasted (overlaid) into the reference hair image for a pasted reference hair image 300. In one example, a deep neural network is used for inpainting hair on the image, where the hair would be behind the head.

Next, image processing is applied to extract and blur a bottom of the selfie image segmentation mask 284 by creating a bottom selfie face mask 302, and then dilating and blurring the mask 302 (as shown at block 304) to create a dilated and blurred bottom selfie face mask 306 that is used to overlay a bottom part of the face from the aligned selfie image 216 with a bottom part of the face from the pasted image 232. This overlay is performed to position a forehead and hairline area from the composite output image 242 into the pasted reference hair image 300, as shown at block 308, to create a pre-output image 310 that reduces presence of artifacts.

In the composite output image 242, clothing of the person may have been modified, such as to insert a digital black t-shirt for example. Thus, within the output image 314, it is desirable to include a real item of clothing, and if possible, to use content from the aligned selfie image 216 to return to an original t-shirt. Whether the content of the aligned selfie image 216 for clothing can be used is dependent upon changes and modifications made to hair of the person. As a result, a next function includes clean-up the pre-output image 310 (as shown at block 312), such as by modifying the pre-output image 310 to include clothing based on a length of hair in the aligned selfie image 216 in relation to a shoulder area of the person or modifying the pre-output image 310 to include clothing based on occlusion of hair in the aligned selfie image 216 in relation to the person. As an example, when hair overlaps shoulders in the pre-output image 310, the pre-output image 310 is modified to replace any shirt with a digital representation of a black t-shirt.

FIGS. 12-17 are example digital image representations illustrating step-wise modifications made to the images to perform functions shown in FIG. 8, according to an example implementation. FIG. 12 illustrates the digital image 200 including the face area 202 of the person and the background area 204 is received. FIG. 13 illustrates that pre-processing of the digital image 200 for at least one of aligning, cropping, and resizing the digital image 200 is performed such that the digital image 200 is cropped to be of a preset size and aligned such that the face of the person is in a center of the image to create the aligned selfie image 216.

FIG. 14 illustrates that the aligned selfie image 216 is modified, based on the aligned reference image 218, to transfer a hairstyle from the aligned reference image 218 to the aligned selfie image 216. Thus, as shown in the modified digital image 232, the hairstyle from the aligned reference image 218 is pasted onto the aligned selfie image 216. The face area 202 and the background area 204 in the modified digital image 232 are the same as the original look of the face area 202 and the background area 204 in the aligned selfie image 216. The boundaries of the hairstyle to the face area 202 and the background area 204, however, are now blended and further enhancements are required at this stage to result in a photorealistic view.

The generative neural network 236 is executed to process the modified digital image 232 resulting in the edited image 238 in which boundaries of the hairstyle to the face area 202 and the background area 204 are modified. FIG. 15 illustrates the boundaries of the hairstyle to the face area 202 and the background area 204 modified for a more realistic and look. However, while the execution of the generative neural network 236 modifies features of the hairstyle and hairline, the execution of the generative neural network 236 also modifies features of all areas of the modified digital image 232 including features of the face 202 and features of the background 204.

As a result, next functions include replacing the background area on the modified digital image 238 with the background area 204 of the aligned selfie image 216 to put back the original background into the composite output image 242, as shown in FIG. 16. Similarly, next functions include replacing the face area on the modified digital image 238 with the original selfie face (e.g., with the face area 202 of the person captured from the aligned selfie image 216) to put back the original face as well to obtain the composite output image 242, as shown in FIG. 16.

Once the original face area 202 and the original background area 204 are applied, some components of the modified digital image 238 may require further enhancements. Thus, inpainting and face restoration are used (e.g., applying a sharpening filter) to the composite output image 242 to improve contrast and generate the output image 314, as shown in FIG. 17. Functions of the sharpening filter are performed, for example, using a classical unsharpen image processing technique or deep learning neural network computations. Example enhancements of FIG. 16 include further blending of the hairline around the face area 202, filling in pieces around a neckline, and enhancing contours around the chin area. The output image 314 thus includes the face and background of the original input image with modifications to the hair of the person in which the modifications are complete with respect to the head area and represent a photo-realistic view of the person.

Figure 18:
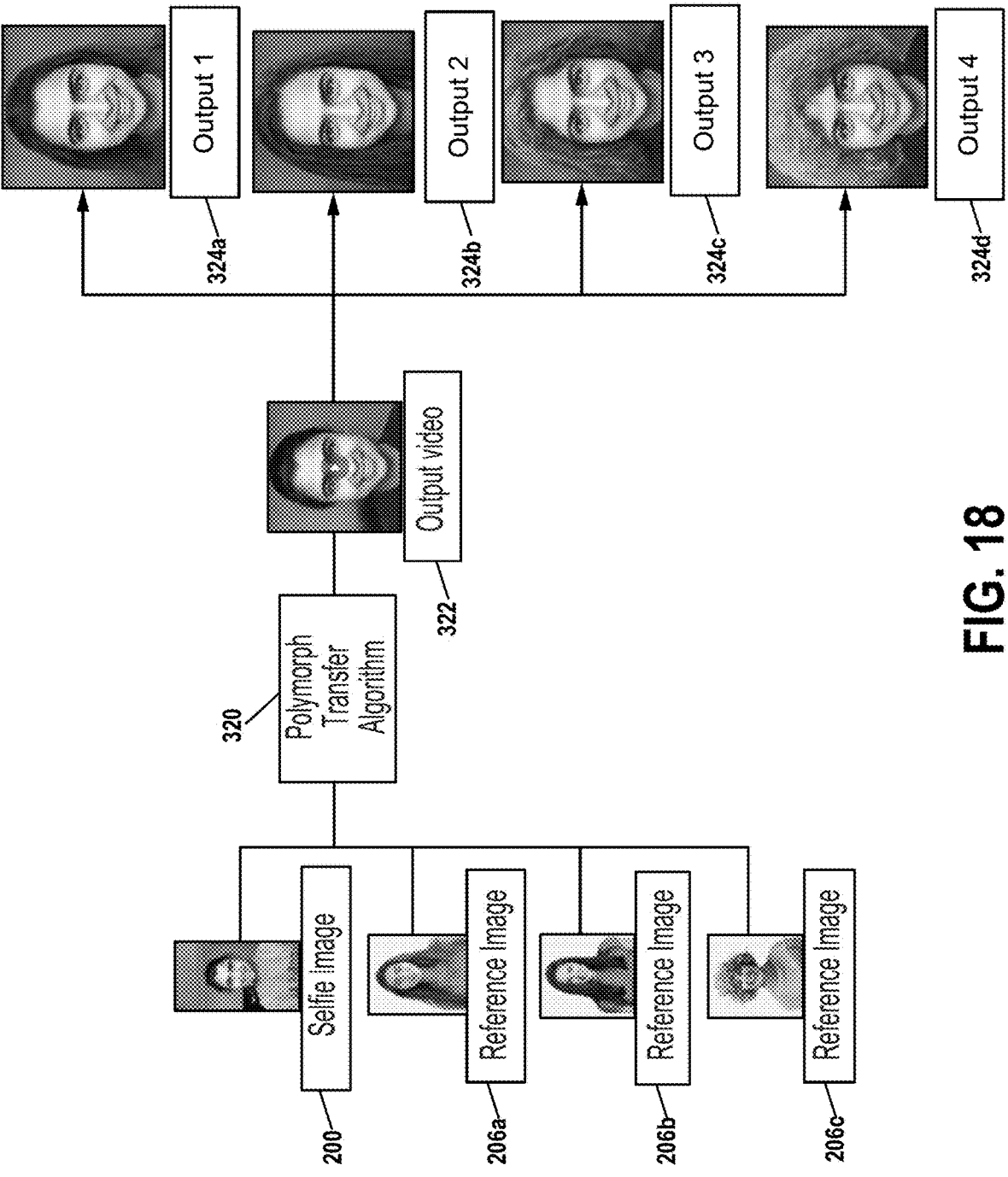
FIG. 18 is a workflow diagram illustrating example functions of hairstyle transfers from multiple reference images, according to an example implementation.

FIG. 18 is a workflow diagram illustrating example functions of hairstyle transfers from multiple reference images, according to an example implementation. For example, the hair transform algorithm can be executed multiple times in parallel, such as when multiple reference images are input, to enable a user to swap between different looks. Generally, the workflow in FIG. 18 begins with receiving the selfie image 200 and reference multiple reference images 206*a-c* that each have an image of a person with a different hairstyle. The selfie image 200 and the reference images 206*a-c* are each input to a polymorph transfer algorithm 320 that performs piecewise morphing of the reference images 206*a-c* such that dimensions of components of the plurality of subjects in the reference images 206*a-c* are morphed into dimensions of components of the first subject in the digital image 200 to create a plurality of morphed reference images with transferred hairstyles that are combined into an output video 322. The output video 322 includes animation illustrating piecewise changes of the images from the selfie image 200 to each of the reference images 206*a-c*, and example piecewise images 324*a-d* are shown in FIG. 18 illustrating changes from an original hairstyle in the selfie image 200 to a longer hairstyle of the input reference image 206 (shown between the piecewise images 324*a-b*), changes from the longer light brown hairstyle to longer dark brown hairstyle, and then changes from the dark brown hairstyle to the shown light color hairstyle (shown between the piecewise images 324*c-d*).

Figure 19:
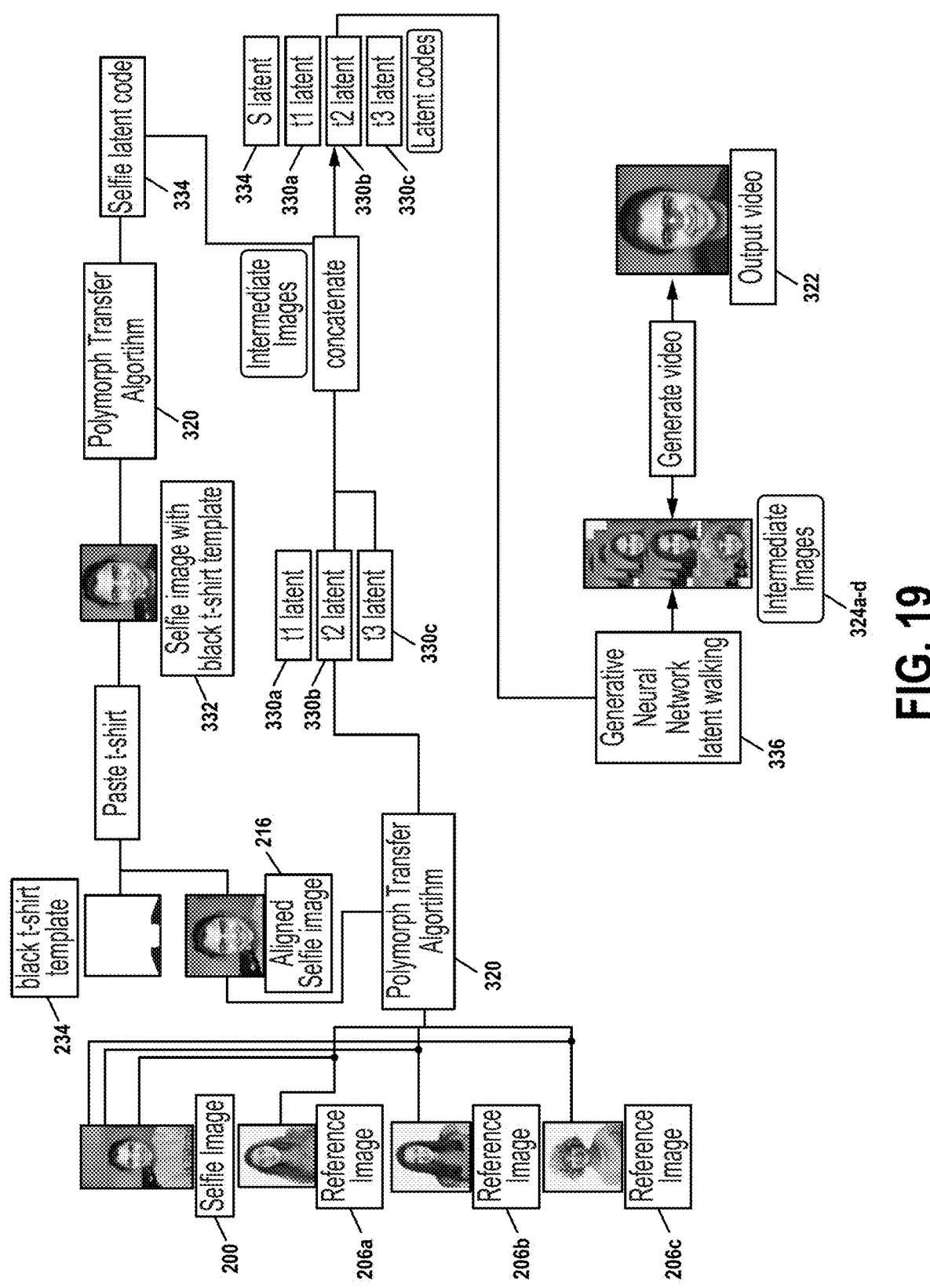
FIG. 19 is a detailed workflow diagram of the functions shown in FIG. 18, according to an example implementation.

FIG. 19 is a detailed workflow diagram of the functions shown in FIG. 18, according to an example implementation. In FIG. 19, outputs of the polymorph transfer algorithm 320 are latent codes 330*a-c* for each of the reference images 206*a-c*. In parallel, for example, the workflow includes processing the aligned selfie image 216 with the black t-shirt template 234 to create a selfie image with the black t-shirt template 332 that is processed through the polymorph transfer algorithm 320 to generate a selfie latent code 334. All of the latent codes (e.g., the selfie latent code 334 and the reference image latent codes 330*a-c*) are concatenated together and fed to the generative neural network, as shown at block 336, to obtain inverted images in the pixel domain from which the output video 322 is generated, for example.

Within examples described herein, the first subject in the digital selfie image and the second subject in the reference image are considered real-world persons. Thus, the digital image including the face area of the first subject is a first real-world person, the reference image of the second subject is a second real-world person, and a hairstyle of the second real-world person is transferred to the first real-world person.

In another example, the digital image including the face area of the first subject is a first real-world person, and the reference image of the second subject is a second virtual person or avatar. In this example, the virtual person or avatar includes a cartoon or other computer-generated image. Then, a hairstyle of the second virtual person or avatar is transferred to the first real-world person in a digital manner.

In still another example, the digital image including the face area of the first subject includes a first virtual person or avatar, the reference image of the second subject includes a second real-world person, and a hairstyle of the second real-world person is transferred to the first virtual person or avatar in a digital manner.

In yet another example, the digital image including the face area of the first subject includes a virtual person or avatar, and the reference image of the second subject includes a second virtual person or avatar, and a hairstyle of the second virtual person or avatar is transferred to the first virtual person or avatar in a digital manner.

Within examples herein, functions of the workflows shown in FIGS. 7-11 and FIGS. 18-19 are performed by the client device 102, by the host server device 106, or by a combination of the client device 102 and the host server device 106.

FIG. 20 is a flowchart illustrating an example of a computer-implemented image processing method 400, according to an example implementation. Method 400 shown in FIG. 20 presents an example of a method that could be used with or performed by the networked computer system 100, the client devices 102 and 104, and/or the host server device(s) 106 shown in FIG. 1 or the image processing platform 130 shown in FIGS. 2-4, or any combination thereof, for example. Method 400 also presents an example of functions to be performed to generate outputs for display by the GUI 140.

Within examples, devices or systems described herein are used or configured to perform logical functions presented in FIG. 20. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. Method 400 includes one or more operations, functions, or actions as illustrated by one or more of blocks 402-410. Although the blocks are illustrated in a sequential order, these blocks may also be performed in parallel, and/or in a different order than those described herein. In addition, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium includes non-transitory computer readable medium or memory, for example, such as computer-readable media that stores data for short periods of time like register memory, processor cache and Random Access Memory (RAM). The computer readable medium additionally or alternatively includes non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 20, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 includes receiving a digital image including a face area of a first subject and a background area.

At block 404, the method 400 includes receiving a reference image of a second subject.

At block 406, the method 400 includes modifying the digital image based on the reference image utilizing a generative neural network to create a modified digital image in which a feature of the second subject is transferred to the first subject. The generative neural network is a GAN, in some examples. In other examples, the generative neural network includes other forms of a deep neural network, whether in a form of software machine learning algorithms executable by a processor, or in a form of networked computer components, for example.

In one example, modifying the digital image includes piecewise morphing of the reference image such that dimensions of components of the second subject are morphed into dimensions of components of the first subject to create a morphed reference image. In some examples, the method 400 optionally includes receiving a plurality of reference images of a plurality of subjects and the reference image of the second subject is one of the plurality of reference images, piecewise morphing of the plurality of reference images such that dimensions of components of the plurality of subjects are morphed into dimensions of components of the first subject to create a plurality of morphed reference images, wherein the morphed reference image is one of the plurality of morphed reference images, and based on selection of one of the plurality of reference images, outputting a corresponding one of the plurality of morphed reference images as the modified digital image.

In yet further examples, block 406 further includes superimposing the face area of the first subject and the background with the morphed reference image to create the modified digital image.

In some examples, block 406 includes projecting the digital image into a latent vector space to create a vector image, modifying the vector image based on the reference image utilizing the generative neural network to create a modified vector image, and inverting the modified vector image into the modified digital image.

In some examples, block 406 includes modifying the digital image to transfer hair of the second subject to the first subject. Different types of reference images can be received for use in block 406. In one example, block 406 includes receiving the digital image including the face area of the first subject comprises receiving the digital image including the face area of a first real-world person, receiving the reference image of the second subject comprises receiving the reference image of a second real-world person, and modifying the digital image based on the reference image utilizing the generative neural network to create the modified digital image comprises transferring the feature of the second real-world person to the first real-world person. In another example, block 406 includes receiving the digital image including the face area of the first subject comprises receiving the digital image including the face area of a first real-world person, receiving the reference image of the second subject comprises receiving the reference image of a second virtual person or avatar, and modifying the digital image based on the reference image utilizing the generative neural network to create the modified digital image comprises transferring the feature of the second virtual person or avatar to the first real-world person.

In still other examples, block 406 includes receiving the digital image including the face area of the first subject comprises receiving the digital image including the face area of a first virtual person or avatar, receiving the reference image of the second subject comprises receiving the reference image of a second real-world person, and modifying the digital image based on the reference image utilizing the generative neural network to create the modified digital image comprises transferring the feature of the second real-world person to the first virtual person or avatar. In another example, block 406 includes receiving the digital image including the face area of the first subject comprises receiving the digital image including the face area of a virtual person or avatar, receiving the reference image of the second subject comprises receiving the reference image of a second virtual person or avatar, and modifying the digital image based on the reference image utilizing the generative neural network to create the modified digital image comprises transferring the feature of the second virtual person or avatar to the first virtual person or avatar.

At block 408, the method 400 includes extracting a feature area from the modified digital image including a portion of the modified digital image with the feature of the second subject transferred to the first subject, and the face area of the first subject and the background area from the digital image. In one example, extracting the feature area from the modified digital image includes performing mask segmentation of (i) the digital image to segment the face area of the first subject and the background area and of (ii) the reference image to segment the feature of the second subject.

At block 410, the method 400 includes combining the face area of the first subject and the background area from the digital image with the feature area from the modified digital image to create a composite modified digital image that includes data representing the feature of the second subject transferred to the first subject from the modified digital image and data representing the face area of the first subject and the background area from the digital image.

Within examples, the method 400 also includes inpainting the composite modified digital image to preserve a photo-realistic view of the first subject. In one example, inpainting includes based on a comparison of the digital image, the modified digital image, and the composite modified digital image, filling in an area of the feature area within the modified digital image, and preserving an identity of the first subject for a photo-realistic view of the first subject in the composite modified digital image. In another example, inpainting includes performing segmentation of the composite modified digital image to segment the background area and the feature area into a reference image, digitally filling in an area of the feature area within the reference image, and positioning the face area of the first subject from the digital image into the reference image for a pasted reference image. In another example, functions of inpainting includes using a face segmenting mask, positioning a forehead and hairline area from the composite modified digital image into the pasted reference image to create a pre-output image. In another example, further functions of inpainting include modifying the pre-output image to include clothing based on a length of hair in the digital image in relation to a shoulder area of the first subject.

Within examples, the method 400 also includes modifying a color balance of the composite modified digital image such that components from the digital image in the composite modified digital image substantially match a perceived quality of components from the reference image in the composite modified digital image. In another example, the method 400 includes modifying a color balance of the composite modified digital image such that components from the reference image in the composite modified digital image substantially match a perceived quality of components from the digital image in the composite modified digital image. In still another example, modifying a color balance of the composite modified digital image to maintain a perceived quality of the digital image in the composite modified digital image. In yet another example, the method 400 includes determining first scene conditions of the digital image, wherein the scene conditions include lighting features across the face area of the first subject, and modifying second scene condition of the composite modified digital image to substantially match the first scene conditions of the digital image.

Within examples, the method 400 also includes performing pre-processing of the digital image for at least one of aligning, cropping, and resizing the digital image prior to modifying the digital image utilizing the generative neural network.

Using example methods, devices, and systems described herein enables a photorealistic output image modified such that features of the hair are changed as instructed. An identity of the person in the original selfie is preserved such that features of the face are not modified, and only features of the hairstyle are modified. The selfie identity is preserved by morphing the model's hair to the head shape of the selfie before inverting the image with the generative neural network, and by blending the hairline and the forehead of the inverted image with the selfie, with image processing, for example.

In addition, example methods utilize a single pipeline and single execution of the generative neural network to preserve identity of the person by blending the hairline and the forehead of the generative neural network-inverted image with the original selfie, for example. The single pipeline and single execution of the generative neural network returns photorealistic results of hairstyle transfer much faster (e.g., in the order of seconds) as compared to runtimes of other existing methods that requires multiple executions of processing networks (e.g., requiring on the order of minutes to return a result).

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described to explain the principles of the examples, the practical application, and to enable others of ordinary skill in the art to understand the disclosure for various examples with various modifications as are suited to the particular use contemplated.

Having described the subject matter of the present disclosure in detail and by reference to specific examples thereof, it is noted that the various details disclosed herein should not be taken to imply that these details relate to elements that are essential components of the various examples described herein, even in cases where a particular element is illustrated in each of the drawings that accompany the present description. Further, it will be apparent that modifications and variations are possible without departing from the scope of the present disclosure, including, but not limited to, examples defined in the appended claims. More specifically, although some aspects of the present disclosure are identified herein as preferred or particularly advantageous, it is contemplated that the present disclosure is not necessarily limited to these aspects.

Moreover, while some examples have been described in the context of fully functioning computers and computer systems, those skilled in the art will appreciate that various examples are capable of being distributed as a program product in a variety of forms, and that the disclosure applies equally regardless of a particular type of machine or computer-readable media used to effect the distribution.

Further examples of machine-readable storage media, machine-readable media, or computer-readable (storage) media include, but are not limited to, recordable type media such as volatile and non-volatile memory devices, floppy and other removable drives, hard drives, optical disks (e.g., Compact Disk Read-Only Memory (CD ROMS), Digital Versatile Disks, (DVDs), etc.), among others, and transmission type media such as digital and analog communication links.

For the purposes of describing and defining examples herein, it is noted that terms "substantially" or "about" are utilized herein to represent an inherent degree of uncertainty attributed to any quantitative comparison, value, measurement, or other representation. The terms "substantially" and "about," when utilized herein, represent the degree by which a quantitative representation may vary from a stated reference without resulting in a change in a basic function of the subject matter at issue.

What is claimed is:

1. A computer-implemented image processing method, comprising:

receiving an original digital image including a face area of a first subject and a background area;

receiving a reference image of a second subject;

modifying the original digital image based on the reference image utilizing a generative neural network to create a modified original digital image in which a feature of the second subject is transferred to the first subject;

extracting a feature area from the modified original digital image including a portion of the modified original digital image with the feature of the second subject transferred to the first subject, and extracting the face area of the first subject and the background area from the original digital image; and replacing a portion of modified face and background areas of the modified original digital image with the face area of the first subject and the background area from the original digital image to create a composite modified digital image that includes (i) data representing the feature of the second subject transferred to the first subject as extracted from the modified original digital image and (ii) data representing the face area of the first subject and the background area as extracted from the original digital image.

2. The method of claim 1, wherein modifying the original digital image based on the reference image utilizing the generative neural network to create the modified original digital image comprises:

piecewise morphing of the reference image such that dimensions of components of the second subject are morphed into dimensions of components of the first subject to create a morphed reference image.

3. The method of claim 2, further comprising:

receiving a plurality of reference images of a plurality of subjects, wherein the reference image of the second subject is one of the plurality of reference images;

piecewise morphing of the plurality of reference images such that dimensions of components of the plurality of subjects are morphed into dimensions of components of the first subject to create a plurality of morphed reference images, wherein the morphed reference image is one of the plurality of morphed reference images; and based on selection of one of the plurality of reference images, outputting a corresponding one of the plurality of morphed reference images as the modified original digital image.

4. The method of claim 2, further comprising:

superimposing the face area of the first subject and the background with the morphed reference image to create the modified original digital image.

5. The method of claim 1, wherein modifying the original digital image based on the reference image utilizing the generative neural network comprises:

projecting the original digital image into a latent vector space to create a vector image;

modifying the vector image based on the reference image utilizing the generative neural network to create a modified vector image; and inverting the modified vector image into the modified original digital image.

6. The method of claim 1, wherein modifying the original digital image based on the reference image utilizing the generative neural network to create the modified digital image comprises:

modifying the original digital image to transfer hair of the second subject to the first subject.

7. The method of claim 1, wherein:

receiving the original digital image including the face area of the first subject comprises receiving the original digital image including the face area of a first real-world person;

receiving the reference image of the second subject comprises receiving the reference image of a second real-world person; and modifying the original digital image based on the reference image utilizing the generative neural network to create the modified original digital image comprises transferring the feature of the second real-world person to the first real-world person.

8. The method of claim 1, wherein:

receiving the original digital image including the face area of the first subject comprises receiving the original digital image including the face area of a first real-world person;

receiving the reference image of the second subject comprises receiving the reference image of a second virtual person or avatar; and modifying the original digital image based on the reference image utilizing the generative neural network to create the modified original digital image comprises transferring the feature of the second virtual person or avatar to the first real-world person.

9. The method of claim 1, wherein:

receiving the original digital image including the face area of the first subject comprises receiving the original digital image including the face area of a first virtual person or avatar;

receiving the reference image of the second subject comprises receiving the reference image of a second real-world person; and modifying the original digital image based on the reference image utilizing the generative neural network to create the modified original digital image comprises transferring the feature of the second real-world person to the first virtual person or avatar.

10. The method of claim 1, wherein:

receiving the original digital image including the face area of the first subject comprises receiving the original digital image including the face area of a virtual person or avatar;

receiving the reference image of the second subject comprises receiving the reference image of a second virtual person or avatar; and modifying the original digital image based on the reference image utilizing the generative neural network to create the modified original digital image comprises transferring the feature of the second virtual person or avatar to the first virtual person or avatar.

11. The method of claim 1, wherein extracting the feature area from the modified original digital image, and the face area of the first subject and the background area from the original digital image comprises:

performing mask segmentation of (i) the original digital image to segment the face area of the first subject and the background area and of (ii) the reference image to segment the feature of the second subject.

12. The method of claim 1, further comprising:

inpainting the composite modified digital image to preserve a photo-realistic view of the first subject.

13. The method of claim 12, wherein inpainting the composite modified digital image comprises:

based on a comparison of the original digital image, the modified original digital image, and the composite modified digital image, filling in an area of the feature area within the modified original digital image; and preserving an identity of the first subject for a photo-realistic view of the first subject in the composite modified digital image.

14. The method of claim 12, wherein inpainting the composite modified digital image comprises:

performing segmentation of the composite modified digital image to segment the background area and the feature area into a reference image;

digitally filling in an area of the feature area within the reference image; and positioning the face area of the first subject from the digital image into the reference image for a pasted reference image.

15. The method of claim 14, further comprising:

using a face segmenting mask, positioning a forehead and hairline area from the composite modified digital image into the pasted reference image to create a pre-output image.

16. The method of claim 15, further comprising:

modifying the pre-output image to include clothing based on a length of hair in the digital image in relation to a shoulder area of the first subject.

17. The method of claim 1, further comprising:

modifying a color balance of the composite modified digital image such that components from the original digital image in the composite modified digital image substantially match a perceived quality of components from the reference image in the composite modified digital image.

18. The method of claim 1, further comprising:

modifying a color balance of the composite modified digital image such that components from the reference image in the composite modified digital image substantially match a perceived quality of components from the original digital image in the composite modified digital image.

19. The method of claim 1, further comprising:

modifying a color balance of the composite modified digital image to maintain a perceived quality of the original digital image in the composite modified digital image.

20. The method of claim 1, further comprising:

determining first scene conditions of the original digital image, wherein the scene conditions include lighting features across the face area of the first subject; and modifying second scene condition of the composite modified digital image to substantially match the first scene conditions of the original digital image.

21. The method of claim 1, further comprising:

performing pre-processing of the original digital image for at least one of aligning, cropping, and resizing the digital image prior to modifying the original digital image utilizing the generative neural network.

22. A non-transitory computer-readable media having stored therein executable instructions, which when executed by a system including one or more processors causes the system to perform functions comprising:

receiving an original digital image including a face area of a first subject and a background area;

receiving a reference image of a second subject;

modifying the original digital image based on the reference image utilizing a generative neural network to create a modified original digital image in which a feature of the second subject is transferred to the first subject;

extracting a feature area from the modified original digital image including a portion of the modified original digital image with the feature of the second subject transferred to the first subject, and extracting the face area of the first subject and the background area from the original digital image; and replacing a portion of modified face and background areas of the modified original digital image with the face area of the first subject and the background area from the original digital image to create a composite modified digital image that includes (i) data representing the feature of the second subject transferred to the first subject as extracted from the modified original digital image and (ii) data representing the face area of the first subject and the background area as extracted from the original digital image.

23. The non-transitory computer-readable media of claim 22, wherein the functions further comprise:

receiving a plurality of reference images of a plurality of subjects, wherein the reference image of the second subject is one of the plurality of reference images; and wherein modifying the original digital image based on the reference image utilizing the generative neural network to create the modified original digital image comprises:

piecewise morphing of the plurality of reference images such that dimensions of components of the plurality of subjects are morphed into dimensions of components of the first subject to create a plurality of morphed reference images; and based on selection of one of the plurality of reference images, outputting a corresponding one of the plurality of morphed reference images as the modified digital image.

24. A system comprising:

one or more processors and non-transitory computer-readable media having stored therein instructions, which when executed by the one or more processors, causes the system to perform functions comprising:

receiving an original digital image including a face area of a first subject and a background area;

receiving a reference image of a second subject;

modifying the original digital image based on the reference image utilizing a generative neural network to create a modified original digital image in which a feature of the second subject is transferred to the first subject;

extracting a feature area from the modified original digital image including a portion of the modified original digital image with the feature of the second subject transferred to the first subject, and extracting the face area of the first subject and the background area from the original digital image; and replacing a portion of modified face and background areas of the modified original digital image with the face area of the first subject and the background area from the original digital image to create a composite modified digital image that includes (i) data representing the feature of the second subject transferred to the first subject as extracted from the modified original digital image and (ii) data representing the face area of the first subject and the background area as extracted from the original digital image.

25. The system of claim 24, wherein the functions further comprise:

modifying a color balance of the composite modified digital image such that components from the original digital image in the composite modified digital image substantially match a perceived quality of components from the reference image in the composite modified digital image.

* * * * *